US006303210B1

(12) United States Patent
Watanabe et al.

(10) Patent No.: US 6,303,210 B1
(45) Date of Patent: Oct. 16, 2001

(54) BIAXIALLY ORIENTED POLYESTER FILM FOR THERMAL TRANSFER RIBBON, LAMINATED FILM COMPOSED THEREOF AND ITS PRODUCTION

(75) Inventors: Shinya Watanabe; Koji Furuya; Shinichi Kawai, all of Kanagawa; Kenji Suzuki, Tokyo, all of (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/554,114

(22) PCT Filed: Sep. 10, 1999

(86) PCT No.: PCT/JP99/04953

§ 371 Date: May 10, 2000

§ 102(e) Date: May 10, 2000

(87) PCT Pub. No.: WO00/15446

PCT Pub. Date: Mar. 23, 2000

(30) Foreign Application Priority Data

| | | |
|---|---|---|
| Sep. 11, 1998 | (JP) | 10-258489 |
| Sep. 28, 1998 | (JP) | 10-273145 |
| Sep. 29, 1998 | (JP) | 10-275419 |
| Oct. 7, 1998 | (JP) | 10-285075 |
| Nov. 16, 1998 | (JP) | 10-324928 |

(51) Int. Cl.[7] .......... B32B 27/08; B32B 27/20; B32B 27/30; B32B 27/36; B32B 27/40

(52) U.S. Cl. .......... 428/141; 428/323; 428/328; 428/330; 428/331; 428/423.7; 428/480; 428/483; 428/694 ST; 428/694 SG; 428/910; 427/384; 427/385.5; 427/393.5

(58) Field of Search .......... 428/141, 323, 428/328, 330, 331, 423.7, 480, 483, 694 ST, 694 SG, 910; 427/384, 385.5, 393.5

(56) References Cited

U.S. PATENT DOCUMENTS

| | | | | |
|---|---|---|---|---|
| 5,188,774 | * | 2/1993 | Nitta et al. | 264/22 |
| 5,262,460 | * | 11/1993 | Suzuki et al. | 524/135 |
| 6,042,773 | * | 3/2000 | Teramoto et al. | 264/484 |

FOREIGN PATENT DOCUMENTS

| | | | |
|---|---|---|---|
| 62-299526 | | 12/1987 | (JP) . |
| 62-207682 | | 8/1988 | (JP) . |
| 4-10985 | | 1/1992 | (JP) . |
| 04-275340 | * | 9/1992 | (JP) . |
| 7-149062 | | 6/1995 | (JP) . |
| 8-164592 | | 6/1996 | (JP) . |
| 9-52457 | | 2/1997 | (JP) . |
| 10-020441 | * | 1/1998 | (JP) . |
| 10-146937 | | 6/1998 | (JP) . |

* cited by examiner

*Primary Examiner*—Vivian Chen
(74) *Attorney, Agent, or Firm*—Sughrue, Mion, Zinn, Macpeak & Seas, PLLC

(57) ABSTRACT

A biaxially oriented polyester film for thermal transfer use produced by using a polyester composed of a dicarboxylic acid component and a diol component as a constituent component characterized in that said film contains a sulfonic acid quaternary phosphonium salt having an ester-forming functional group in an amount of 0.1 to 40 mmol % based on said dicarboxylic acid component, the alternate current volume resistivity of the film is $6\times10^8$ Ω·cm or below in molten state and the endothermic subpeak temperature of the film other than the melting point and determined by DSC is between 225° C. and the melting point, a laminated film produced by forming an adhesiveness improving layer on at least one surface of the biaxially oriented polyester film, and its production process.

16 Claims, 1 Drawing Sheet

BIAXIALLY ORIENTED POLYESTER FILM FOR THERMAL TRANSFER RIBBON, LAMINATED FILM COMPOSED THEREOF AND ITS PRODUCTION

TECHNICAL FIELD

The present invention relates to a biaxially oriented polyester film for a thermal transfer ribbon, a laminated film composed thereof and its production process. More particularly it relates to a biaxially oriented polyester film for a thermal transfer ribbon having excellent productivity (concretely, increased film-forming speed, decreased breaking frequency of film in film-forming process and improved yield from stock film) and giving a ribbon for thermal transfer printer having excellent printing performance and free from the troubles of thin ink spot even in the case of high-speed printing and creasing of the ribbon caused by the friction with a head, a laminated film having an adhesiveness improving layer on the above biaxially oriented polyester film and having excellent adhesivity to a thermal transfer ink layer, and a process for the production of the biaxially oriented polyester film.

BACKGROUND ARTS

Thermal transfer recording is a process to print an image and letter by the transfer of a thermal ink included in a thermal transfer ribbon to an image-receiving paper by the heat generated by a thermal head and is being popularized owing to low printing noise and easy color printing ability.

Two types of the thermal transfer recording, i.e. hot-melt type and sublimation type, have been put into practice, and the sublimation-type thermal transfer recording process has rapidly been spreading recently as a recording process enabling easy output of a full-color image having high picture quality. The sublimation-type thermal transfer process is a process using a thermal transfer ribbon produced by coating a surface of a base film with a thermal transfer ink having a composition containing a heat-sublimable dye dispersed in a binder, laying the ribbon on a printing object, contacting a thermal head with the thermal transfer ribbon to apply thermal energy to the ribbon to effect the sublimation of the heat-sublimable dye exclusively at the heated part and the transfer of the sublimed dye to the image-receiving face of the transfer object (printing paper, film, etc.) to print an image or letter.

According to the recent requirement for increasing the printing speed, the increase in the temperature of the thermal head in printing and the thinning of the thermal transfer ribbon are required for the efficient transfer of heat from the thermal head to the thermal transfer ribbon.

However, the thermal deformation of the base film of the thermal transfer ribbon becomes nonnegligible by the increase of the thermal head temperature in printing to cause the problems of the unclear printed image and the generation of crease of the thermal transfer ribbon and, in extreme case, the printing becomes completely impossible.

It is necessary to decrease the thickness of the base film of the thermal transfer ribbon for the thinning of the transfer ribbon. A biaxially drawn polyester film having excellent heat-resistance and mechanical properties is used as the base film. However, the workability in the ink layer application process and the slitting process becomes poor by merely decreasing the thickness of conventional polyester film.

The above workability depends upon the slipperiness of the film surface, and it is generally known that the slipperiness of a polyester film can be improved by forming minute irregularity on the film surface. Examples of known process for the application of irregularity are the addition of inert particles during or after the polymerization of a thermoplastic polymer to be used as a raw material for the film (external particle addition method) and the separation of a part or total of the catalyst, etc., used in the polymerization of a thermoplastic polymer during the reaction process to precipitate the separated particles in the polymer (internal particle precipitation method).

However, when a polymer incorporated with inert particles is formed to a film while keeping the concentration of the particles at a constant level in the process for the production of an ultrathin film which is an object of the present invention, the number of the inert particles per unit area decreases, the distance between protrusions on the film surface originated from the particles increases and the slipperiness of the film becomes poor owing to excessive flattening of the film surface. Accordingly, the more the film thickness decreases, the more the addition concentration or the particle diameter of the inert particles should be increased to compensate the lowering of the slipperiness caused by the decrease of the film thickness.

When the diameter of the inert particle is increased, voids are frequently generated on the interface, i.e. around the inert particle owing to the poor affinity of the inert particle and the thermoplastic polymer especially in the melt-extrusion or drawing at a high drafting ratio, resulting in the occurrence of problems of remarkable lowering of the mechanical properties (e.g. mechanical strength) of the produced film and the increase in the breakage frequency in the production of the film to lower the productivity of the film.

A polyester film having restricted surface roughness is proposed as such base film in JP A62-299389, however, the above two problems cannot be solved by such film.

In the sublimation-type thermal transfer process, the sublimable dye is present in a binder, only the dye is sublimed with heat and the sublimed dye is absorbed in the image-receiving layer of the transfer object paper to form a graded image on the paper. For subliming exclusively the dye, high adhesivity is necessary between the ink layer and the substrate film and the adhesivity is required to be resistant to the lowering with environmental change and aging. When the adhesivity is insufficient, the whole ink layer is transferred to the transfer object paper to cause remarkable deterioration of the gradation. Since a polyester film generally has high crystal orientation, it has poor adhesivity to ink layer, etc., and good adhesion is difficult to attain by the direct application of an ink layer to the film. To solve the problem, applications of physical and chemical treatments to the film surface for increasing the adhesivity to the film have been proposed, however, sufficient adhesivity cannot be attained by these methods.

It is desirable to increase the productivity of a film for providing the film at a low cost, and the improvement on the productivity has the following problems.

The first problem is as follows. A biaxially oriented polyester film is produced usually by extruding a polyester polymer through an extrusion nozzle in molten state, the molten film is quenched on the surface of a rotating chill drum to form an undrawn film and the film is biaxially drawn in longitudinal and lateral directions. In this case, the contact between the molten film and the surface of the rotating chill roll should be increased to eliminate the surface defect and improve the thickness uniformity of the film. A known method for increasing the contact is the installation of a wire electrode on the extrusion nozzle and the surface of the rotating chill drum to deposit electrostatic charge on the surface of the molten film and the quenching of the molten film by closely contacting the film with the surface of the chill drum (hereinafter called as electrostatic casting method). Since the electric resistance of a molten polyester is high in general, the quantity of electrostatic charge on unit area of undrawn film surface becomes small to lower the contact of the molten film to the chill drum surface and increase the film breakage frequency by the generation of pinholes on the film surface and the occurrence of uneven film thickness. The above problem becomes sensible especially in a thin film such as a base film for thermal transfer ribbon.

The second problem is described as follows. The polyester film to be used as a base film is produced generally by forming a stock film having a width larger than that of the product film, cutting both edges and slitting to a prescribed width, and the produced film is processed to obtain a thermal transfer ribbon.

It is necessary to increase the film-forming speed to improve the productivity of a thermal transfer ribbon, however, there is a limitation in the increase of the film-forming speed owing to the possible increase in the shrinkage of the film in heating. Other method for increasing the productivity includes the improvement of the yield of the base film from the produced stock film. However, the improvement of the yield also has a limitation owing to the unevenness of the physical properties of the film in lateral direction to limit the center part of the film to be suitable as the product. The unevenness of the physical properties in the lateral direction of the film are supposed to be caused by a bowing phenomenon, and various measures have been investigated to overcome the problem. The bowing is a phenomenon to skew a straight main orientation axis of a film in lateral direction at the inlet of a tenter to the form of a bow at the outlet of the tenter as described e.g. in "Plastic Molding and Processing" (Vol.4, No.5, pp.312–317, published by Plastic Molding Association). The skew causes the unevenness of physical properties in lateral direction of the film and the improvement has been desired.

Problems to be Solved by the Invention

The object of the present invention is to solve the above problems and provide a biaxially oriented polyester film for thermal transfer ribbon producible in excellent productivity and giving a ribbon for thermal transfer printer having excellent printing performance free from the troubles of thin ink spot even in the case of high-speed printing and creasing of the ribbon caused by the friction with a head, a laminated film having an adhesiveness improving layer on the above biaxially oriented polyester film and having excellent adhesivity to a thermal transfer ink layer, and a process for the production of the biaxially oriented polyester film. Especially, the object of the present invention is to improve the productivity and provide a biaxially oriented polyester film for thermal transfer ribbon enabling high-speed production of the film, decreased breakage frequency in film-forming process and increased yield of the product film from the stock film.

Means for Solving the Problems

The present invention is composed of the following three components for solving the above technological problems.

1. A biaxially oriented polyester film for thermal transfer use made of a polyester composed of a dicarboxylic acid component and a diol component and characterized in that said film contains 0.1 to 40 mmol % of a sulfonic acid quaternary phosphonium salt having an ester-forming functional group based on said dicarboxylic acid component, the molten film has an alternative current volume resistivity of $6\times10^8$ Ω·cm or below and the endothermic subpeak temperature of the film other than the melting point measured by DSC is 225° C. or above and not higher than the melting point.
2. A laminated film characterized by the application of an adhesiveness improving layer containing at least one kind of resin selected from water-soluble or water-dispersible resins comprising urethane resin, polyester resin, acrylic resin or polyester resin modified with vinyl resin to at least one surface of the above biaxially oriented polyester film for thermal transfer use.
3. A process for the production of the laminated film of the item 2 characterized by the lamination of an adhesiveness improving layer formed by the application of a coating liquid containing at least one kind of resin selected from water-soluble or water-dispersible resins comprising urethane resin, polyester resin, acrylic resin or polyester resin modified with vinyl resin to at least one surface of a film before the completion of the orientation and crystallization of the film and the drying, drawing and heat-setting of the product.

Polyester

The biaxially oriented polyester film of the present invention is produced by using, as a constituent component, a polyester composed of a dicarboxylic acid component and a diol component, for example, a polyethylene terephthalate composed of terephthalic acid component and ethylene glycol component or a polyethylene-2,6-naphthalate composed of 2,6-naphthalenedicarboxylic acid component and ethylene glycol component. The polyester may be a polyester copolymerized with 20 mol % or over of a third component in addition to the above components based on the total acid component or the total glycol component. The characteristic properties of the main component of the film are not so extremely deteriorated by the addition of 20 mol % or over of the third component.

Preferable copolymerizing components are compounds having two ester-forming functional groups, for example, oxalic acid, adipic acid, phthalic acid, sebacic acid, dodecanedicarboxylic acid, succinic acid, isophthalic acid, 5-sodium sulfoisophthalate, terephthalic acid, 2-potassium sulfoterephthalate, 2,7-naphthalenedicarboxylic acid, 1,4-cyclohexanedicarboxylic acid, 4,4'-diphenyldicarboxylic acid, phenylindanedicarboxylic acid, diphenyl ether dicarboxylic acid and their lower alkyl esters, hydroxycarboxylic acids such as p-hydroxyethoxybenzoic acid and their lower alkyl esters, propylene glycol, 1,2-propanediol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, p-xylylene glycol, ethylene oxide adduct of bisphenol A, ethylene oxide adduct of bisphenol S, triethylene glycol, polyethylene oxide glycol, polytetramethylene oxide glycol and neopentyl glycol.

The polyester containing polyethylene terephthalate or polyethyhlene-2,6-naphthalate may have terminal hydroxyl groups and/or carboxyl groups partly or totally blocked with a monofunctional compound such as benzoic acid and methoxypolyalkylene glycol or may be modified with an extremely small amount of an ester-forming compound having three or more functionality such as glycerol and pentaerythritol within a range to form an essentially linear polymer.

The polyester in the present invention may be a blend of two or more kinds of polyesters having different recurring units.

Preferable polyester among these polyesters is polyethylene-2,6-naphthalate composed of 2,6-naphthalenedicarboxylic acid component and ethylene glycol component.

Sulfonic Acid Quaternary Phosphonium Salt Having Ester-forming Functional Group

The biaxially oriented polyester film of the present invention contains 0.1 to 40 mmol % of a sulfonic acid quaternary phosphonium salt having an ester-forming functional group based on the dicarboxylic acid component constituting the polyester. A preferable example of the sulfonic acid quaternary phosphonium salt having an ester-forming functional group is the compound expressed by the following formula (1).

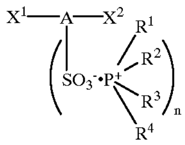

(1)

In the above formula, (n) is an integer of 1 or 2 and A is an aliphatic or aromatic group having a carbon number of from 2 to 18 and a valence of n+2, for example trivalent (n=1) or tetravalent (n=2) group. The aliphatic group is preferably a straight or branched chain saturated or unsaturated group having a carbon number of e.g. from 2 to 10. The aromatic group is preferably a group having a carbon number of from 6 to 18, and more preferable examples of the aromatic group are trivalent or tetravalent benzene skeleton, naphthalene skeleton or biphenyl skeleton. Such aromatic group may be substituted with e.g. an alkyl group, etc., having a carbon number of from 1 to 12 in addition to the groups $X^1$ and $X^2$ and the sulfonic acid quaternary phosphonium salt group.

$X^1$ and $X^2$ are each the same or different hydrogen atom or an ester-forming group. The polyester chain is devoid of copolymerizable group when both $X^1$ and $X^2$ are hydrogen atoms at the same time and, accordingly, $X^1$ and $X^2$ are not hydrogen atoms at the same time and at least one of the groups is an ester-forming functional group.

Examples of the ester-forming functional group are $—OOCR^5$, $—COOH$, $—COOR^6$, $—C_mH_{2m}OH$, $—(OC_pH_{2p})_qOH$ and $—CH_2—(OC_rH_{2r})_sOH$. In the above groups, $R^5$ and $R^6$ are each a lower alkyl group having a carbon number of from 1 to 4 or phenyl group, (m) is an integer of 2 to 10, (p) and (r) are each an integer of 2 to 4 and (q) and (s) are each an integer of 1 or more, e.g. 1 to 100. The lower alkyl groups $R^5$ and $R^6$ may be straight or branched chain groups and the preferable examples are methyl, ethyl, n-propyl, iso-propyl, n-butyl, sec-butyl, etc.

The groups $R^1$, $R^2$, $R^3$ and $R^4$ constituting the sulfonic acid phosphonium salt group are each the same or different alkyl group having a carbon number of from 1 to 18, benzyl group or an aryl group having a carbon number of from 6 to 12. The alkyl group having a carbon number of from 1 to 18 may be straight or branched chain group and the examples of the alkyl group are methyl group, ethyl group, propyl group, butyl group, dodecyl group and stearyl group. The aryl group having a carbon number of from 6 to 12 are preferably phenyl group, naphthyl group, biphenyl group, etc. The phenyl ring of these aryl groups or benzyl groups may be substituted with a halogen atom, nitro group or a lower alkyl group having a carbon number of from 1 to 4.

Preferable concrete examples of the above sulfonic acid quaternary phosphonium salt are 3,5-dicarboxybenzenesulfonic acid tetrabutylphosphonium salt, 3,5-dicarboxybenzenesulfonic acid ethyltributylphosphonium salt, 3,5-dicarboxybenzenesulfonic acid benzyltribuylphosphonium salt, 3,5-dicarboxybenzenesulfonic acid phenyltributylphosphonium salt, 3,5-dicarboxybenzenesulfonic acid tetraphenylphosphonium salt, 3,5-dicarboxybenzenesulfonic acid ethyltriphenylphosphonium salt, 3,5-dicarboxybenzenesulfonic acid butyltriphenylphosphonium salt, 3,5-dicarboxybenzenesulfonic acid benzyltriphenylphosphonium salt, 3,5-dicarbomethoxybenzenesulfonic acid tetrabutylphosphonium salt, 3,5-dicarbomethoxybenzenesulfonic acid ethyltributylphosphonium salt, 3,5-dicarbomethoxybenzenesulfonic acid benzyltributylphosphonium salt, 3,5-dicarbomethoxybenzenesulfonic acid phenyltributylphosphonium salt, 3,5-dicarbomethoxybenzenesulfonic acid tetraphenylphosphonium salt, 3,5-dicarbomethoxybenzenesulfonic acid ethyltriphenylphosphonium salt, 3,5-dicarbomethoxybenzenesulfonic acid butyltriphenylphosphonium salt, 3,5-dicarbomethoxybenzenesulfonic acid benzyltriphenylphosphonium salt, 3-carboxybenzenesulfonic acid tetrabutylphosphonium salt, 3-carboxybenzenesulfonic acid tetrabutylphosphonium salt, 3-carboxybenzenesulfonic acid tetraphenylphosphonium salt, 3-carbomethoxybenzenesulfonic acid tetrabutylphosphonium salt, 3-carbomethoxybenzenesulfonic acid tetraphenylphosphonium salt, 3,5-di(β-hydroxyethoxycarbonyl)benzenesulfonic acid tetrabutylphosphonium salt, 3,5-di(β-hydroxyethoxycarbonyl)benzenesulfonic acid tetraphenylphosphonium salt, 3-(β-hydroxyethoxycarbonyl) benzenesulfonic acid tetrabutylphosphonium salt, 3-(β-hydroxyethoxycarbonyl)benzenesulfonic acid tetraphenylphosphonium salt, 4-hydroxyethoxybenzenesulfonic acid tetrabutylphosphonium salt, bisphenol A-3,3'-di(sulfonic acid tetrabutylphosphonium salt), 2,6-dicarboxynaphthalene-4-sulfonic acid tetrabutylphosphonium salt and α-tetrabutylphosphonium sulfosuccinate. The above sulfonic acid quaternary phosphonium salts may be used singly or in combination.

These sulfonic acid quaternary phosphonium salts are easily producible generally by a known reaction of a corresponding sulfonic acid with phosphines or a known reaction of a corresponding sulfonic acid metal salt with a quaternary phosphonium halide.

The polyester film of the present invention contains the above sulfonic acid quaternary phosphonium salt in an amount of 0.1 to 40 mmol %, preferably 0.1 to 20 mmol %, more preferably 0.2 to 10 mmol % based on the dicarboxylic acid component constituting the polyester. That is to say, different from modified polyesters containing a sulfonic acid quaternary phosphonium salt in an amount sufficient to form the sorption sites for cationic dye, the polyester to be used in the present invention is incorporated with the sulfonic acid quaternary phosphonium salt in an amount to cause essentially negligible degradation of the physical properties such as the lowering of the softening point of the polyester caused by the addition of the sulfonic acid quaternary phosphonium salt, and the polyester has physical properties comparable to those of polyester free from sulfonic acid quaternary phosphonium salt.

Arbitrary known method can be used in the present invention for adding a sulfonic acid quaternary phosphonium salt to the polyester film. For example, the addition can be performed by adding the compound in the polymerization of the polyester polymer and copolymerizing the compound, adding the compound to the polyester polymer before the film-forming process, or preparing a polymer composition containing the compound in high concentration (master chip) and adding and mixing a prescribed amount of the composition before melting the polyester polymer. The desired effect can be attained by either method provided that a prescribed amount of the sulfonic acid quaternary phosphonium salt is finally included in the polyester film.

The alternate current volume resistivity of the biaxially oriented polyester film of the present invention in molten state can be lowered to $6\times10^8$ Ω·cm or below by selecting the kind and addition amount of the above sulfonic acid quaternary phosphonium salt.

The alternative current volume resistivity of the molten film of the present invention has closer relationship to electric charge quantity applicable to the surface of the molten polyester film compared with a direct current volume resistivity. A polyester having an alternate current volume resistivity of $6.0\times10^8$ Ω·cm or below in molten state can be charged with electrostatic charge sufficiently high to enable close contact of the film to a chilling drum rotating at a relatively high speed.

The biaxially oriented polyester film of the present invention has an alternate current volume resistivity of preferably between $0.07\times10^8$ and $6.0\times10^8$ Ω·cm in the form of molten film.

The biaxially oriented polyester film of the present invention is produced by extruding the above-mentioned polyester in molten state through a slit on a rotating chill drum to a thickness of e.g. 10 to 200 μm and cooling the film on the chill drum by uniformly contacting the film to the chill drum. The molten film extruded on the rotary chill drum is forcibly charged with electrostatic charge at a point near (immediately before) the contacting point of the film to the drum in a non-contacting manner e.g. by using an electrode placed in a space separated from the film surface by 3 to 10 mm. The polyester to be used in the present invention contains 0.1 to 40 mmol % of a sulfonic acid quaternary phosphonium salt as mentioned above, exhibits an alternate current volume resistivity of $6.0\times10^8$ Ω·cm or below in molten state and is brought into close contact with a rotating chill drum by the application of such electrostatic charge even in the case of a thin film.

A method for improving the productivity of a film is the increase of the film-forming speed by increasing the rotational speed of the chill drum, however, excessive increase of the rotational speed of the chill drum causes the insufficient contact of the film to the chill drum resulting in the problem of increased unevenness of the film thickness. Accordingly, there is certain upper limit on the rotational speed of the chill drum by conventional method.

The unevenness of film thickness can be suppressed even at a rotational speed increased beyond the limit of the conventional method by adjusting the alternate current volume resistivity of a molten film within the above range and, accordingly, the productivity can be increased.

Endothermic Subpeak Temperature

The endothermic subpeak temperature of the biaxially oriented polyester film of the present invention measured by a differential scanning calorimeter (DSC) and other than the melting point is preferably between 225° C. and the melting point. The temperature range is more preferably between 230° C. and the melting point, especially 235° C. and the melting point, most preferably 240° C. and the melting point. A shoulder peak is sometimes formed when a peak existing at 240° C. or thereabout is superimposed to the melting point peak of the polymer. In this case, the subpeak temperature is determined by subtracting the background of the melting point peak and assuming the observed peak as the endothermic peak.

The biaxially oriented film of the present invention stably keeps the physical properties to maintain the dimensional stability under heating up to the above endothermic subpeak temperature. If the above endothermic subpeak temperature is present only below 225° C., the thermal dimensional stability becomes poor by the application of heat of the subpeak temperature or above to the film.

Since the biaxially oriented film of the present invention is used in a thermal transfer ribbon, the dimensional change caused by the heat applied to the thermal head of a thermal transfer printer is not permissible. The dimensional change can be decreased by setting the endothermic subpeak temperature within the above range.

The adjustment of the above endothermic subpeak temperature within the above range can be achieved by selecting the film-forming conditions to be mentioned later. Concretely, the heat-setting temperature in the film-forming process is set to be high, especially to 225° C. or above.

The endothermic subpeak temperature is lower than the melting point and especially preferably 248° C. or below. A film having an endothermic subpeak temperature higher than the above level is undesirable owing to the loss of flatness. Furthermore, the relaxation of the molecular chain highly oriented by drawing increases in the above film to lower the strength and a thermal transfer ribbon made of such film is sometimes broken by the tension applied by a printer.

Fine Particles (Spherical Silica Fine Particles)

The biaxially oriented polyester film of the present invention preferably has a number of fine protrusions on the surface to improve the windability. These numerous fine protrusions can be formed by including fine particles in the polyester. The fine particles to be used in the present invention are preferably a combination of two kinds of spherical silica particles having large and small average particle diameters or a combination of calcium carbonate and aluminum silicate.

The combination of two kinds of spherical silica particles having large and small average particle diameters is explained as follows.

The two kinds of spherical silica fine particles dispersed in the polyester in the present invention have a diameter ratio (major diameter/minor diameter) of 1.0 to 1.2 in both cases. The average particle diameter is 0.5 to 2 μm, preferably 0.8 to 1.5 μm for one kind of the particle ($S_A$) and 0.01 to 0.8 μm, preferably 0.01 to 0.5 μm for the other kind of the particle ($S_B$).

The average particle diameter of the spherical silica fine particles ($S_A$) is preferably larger than that of the spherical silica fine particles ($S_B$).

Both of these two kinds of spherical silica fine particles have a particle diameter ratio (major axis/minor axis) of 1.0 to 1.2 revealing that the shape of individual fine particle is extremely close to true sphere in contrast with ordinary silica fine particle known as a lubricant composed of ultrafine granular particles of about 10 nm diameter or an agglomerate (agglomerated particle) composed of the ultrafine particles and having a diameter of about 0.5 μm.

The particle diameter ratio is calculated by the following formula. The concrete method will be described later.

Particle diameter ratio=(average major diameter of spherical fine silica particles)/(average minor diameter of spherical fine silica particles)

The average particle diameter of the spherical fine silica particles is, as mentioned before, 0.5 to 2 μm (SA) and 0.01 to 0.8 μm ($S_B$).

When the average particle diameter of the spherical fine silica particle ($S_A$) is smaller than 0.5 μm, the improvement on the slipperiness and workability of the film is insufficient and when it exceeds 2 μm, the breaking strength of the film is lowered to give an easily breakable film. When the average particle diameter of the spherical fine silica particle (SB) is smaller than 0.01 μm, the improvement on the slipperiness and workability of the film is insufficient and when it exceeds 0.8 μm, the surface of the film becomes excessively rough to increase the space factor to an undesirable level.

The term "average particle diameter" means the "equivalent sphere diameter" of the particle corresponding to 50% by weight of the total measured particles. The "equivalent sphere diameter" means the diameter of an imaginary sphere (ideal sphere) having a volume equal to that of the particle and is calculated from the data of electron microscopic observation or ordinary precipitation experiment of the particles.

A biaxially oriented polyester film having an average surface roughness of 10 to 120 nm, especially 10 to 40 nm can be produced by the addition of the above spherical fine silica particles. When the average surface roughness is smaller than 10 nm, a sufficient slipperiness cannot be attained and the winding of the film becomes difficult. A film having an average surface roughness of larger than 120 nm has insufficient thermal conductivity in the high-speed printing with a thermal transfer printer and the printed image becomes indistinct.

Inclusion of two kinds of spherical fine silica particles having different average particle diameter enables the increase in a space factor even if the number of protrusions having a height of 1.5 μm or over is 50/cm$^2$ or under and ensures the workability of the film.

The average particle diameter of the spherical fine silica particles may be larger than the thickness of the film unless the protrusion height is out of the above range.

There is no particular restriction on the production process of the spherical fine silica particle provided that the particle satisfies the above conditions. Concretely, it can be produced, for example, by hydrolyzing ethyl orthosilicate [$Si(OC_2H_5)_4$] to form monodisperse spheres of hydrated silica [$Si(OH)_4$] and dehydrating the monodisperse spheres of the hydrated silica to effect the three-dimensional growth of the following silica bond (J. Japanese Chemical Society, '81, No.9, P1503).

$$Si(OC_2H_5)_4+4H_2O \rightarrow Si(OH)_4+4C_2H_5OH \equiv SiOH+HO—Si\equiv \rightarrow Si—O—Si\equiv +H_2O(\equiv Si—O—Si\equiv \text{ . . . silica bond})$$

The addition amounts of the spherical fine silica particles ($S_A$) and ($S_B$) in the present invention should be 0.1 to 2% by weight and 0.05 to 2% by weight based on the polyester, respectively. When the addition amount of the spherical fine silica particle ($S_A$) is less than 0.1% by weight, the slipperiness and workability of the film are insufficient and a film containing more than 2% by weight of the particle has increased surface roughness and space factor and undesirably lowered breaking strength of the film. When the addition amount of the spherical fine silica particle ($S_B$) is less than 0.05% by weight, the slipperiness and workability of the film become insufficient and when it exceeds 2% by weight, the space factor increases to an undesirable level.

The polyester containing two kinds of spherical fine silica particles in dispersed state can be produced by adding the spherical fine silica particles (preferably in the form of a glycol slurry) to the reaction system at an arbitrary stage in the polymer polymerization process, for example, during the transesterification reaction or polycondensation reaction in transesterification process. Preferably, the spherical fine silica particles are added to the reaction system at the initial stage of the polymerization reaction, for example, before increasing the intrinsic viscosity to about 0.3. The polyester may be incorporated, in addition to the above two kinds of fine silica particles, with a third component comprising a lubricant having particle diameter smaller than those of the above two kinds of fine particles.

A number of protrusions originated from the above two kinds of spherical fine silica particles included in the film are formed on the film surface, and the number of protrusions having a height of 1.5 μm or over can be adjusted to 50/cm$^2$ or under by adjusting the average particle diameters and the contents of the particles. The adjustment of the number of protrusions having a height of 1.5 μm or over to 50/cm$^2$ or below is effective for decreasing the size and number of voids formed around the spherical fine silica particle and decreasing the breaking frequency of film during the drawing and film-forming stages.

The space factor of the biaxially oriented polyester film can be adjusted to 3 to 23% by adjusting the average particle diameters and the contents of the fine particles. The slipperiness and workability (handling easiness) of the film can be improved by adjusting the space factor to 3 to 23%.

The space factor (SF) is calculated from the following formula $$SF(\%)=100-t_1/t_2\times 100$$

wherein $t_1$(μm) is the weight thickness determined from the weight w (g) of 100 cm$^2$ of the film and the density d (g/cm$^3$) of the film and $t_2$ (μm) is the thickness of one sheet of the specimen film determined by stacking 10 sheets of film of 10 cm square and measuring the total thickness with a micrometer.

In the biaxially oriented polyester films of the present invention, the film containing the above two kinds of spherical fine silica particles contains especially little coarse particles to suppress the generation of voids and attain extremely low breaking frequency of the film in film-forming process.

Fine Particles (Calcium Carbonate and Aluminum Silicate)

The combination of calcium carbonate and aluminum silicate is explained below.

The calcium carbonate included in the polyester in the present invention has an average particle diameter of 0.5 to 4.0 μm, preferably 0.5 to The "average particle diameter" can be determined by the method same as the method explained in the aforementioned spherical fine silica particle.

When the average particle diameter of calcium carbonate is smaller than 0.5 μm, the air-squeezing property in the winding of the film in the form of a master roll or a product roll becomes poor (the escape of the entrained air is difficult) and, accordingly, the film is liable to generate crease and has insufficient slipperiness to lower the work ability in the processing stage to an undesirable level. On the other hand, calcium carbonate having an average particle diameter of larger than 4.0 μm causes too high surface roughness of the film, increases the space factor, lowers the dielectric breakdown voltage and increases the electrical insulation defect, etc. The average particle diameter of calcium carbonate may be larger than the film thickness.

In the present invention, the addition amount of the calcium carbonate is 0.1 to 2% by weight, preferably 0.1 to 1% by weight based on the polyester. When the amount of calcium carbonate is less than 0.1% by weight, the air-squeezing property in the winding of the film becomes poor and when it exceeds 2% by weight, the surface of the film becomes too rough and the dielectric breakdown voltage is lowered to undesirable level.

Arbitrary calcium carbonate can be used in the present invention and the examples of calcium carbonate are natural limestone and chalk, calcite crystal such as precipitated calcium carbonate produced from limestone by chemical method, aragonite crystal produced by reacting limemilk with carbon dioxide gas at a high temperature, vaterite crystal and their combinations. Calcium carbonate heavy (calcite crystal) produced by mechanically crushing limestone is also usable as the calcium carbonate.

The aluminum silicate to be added to the polyester in the present invention has an average particle diameter of 0.1 to 2.0 $\mu$m, preferably 0.3 to 1.2 $\mu$m and its content in the film is 0.05 to 1% by weight.

Aluminum silicate having an average particle diameter of the smaller than 0.1 $\mu$m is undesirable owing to the loss of slipperiness of the film to lower the workability, and when the average particle diameter exceeds 2.0 $\mu$m, the surface of the film becomes too rough and the space factor is increased.

When the content of aluminum silicate is less than 0.05% by weight, the air-squeezing property of the film in winding becomes poor and when it exceeds 1% by weight, the surface of the film becomes too rough and the space factor is increased.

The aluminum silicate in the present invention is plate aluminosilicate, and arbitrary kind of the compound can be used. For example, kaolin clay composed of natural kaolin mineral can be used as the aluminum silicate. The kaolin clay may be subjected to a refining treatment such as washing with water.

If the workability of the film of the present invention is to be attained only by the use of calcium carbonate, the space factor of the film becomes excessively large. On the other hand, the use of only aluminum silicate cannot form large protrusions to fail in compatibilizing the workability and the space factor.

The calcium carbonate and the aluminum silicate to be included in the polyester film of the present invention may be added before the polymerization of the polyester polymer or during the polymerization reaction or by kneading with the polymer in an extruder in the pelletization after completing the polymerization, or by adding in the melt-extrusion of the sheet and dispersing in the polymer in the extruder, however, addition before polymerization is preferable.

The addition of calcium carbonate and aluminum silicate to the polyester can be carried out by using arbitrary known process. In the case of adding before the polymerization of a polyester such as polyethylene-2,6-naphthalate, calcium carbonate and aluminum silicate are preferably added to ethylene glycol and dispersed in the polymer e.g. by the application of ultrasonic oscillation.

A biaxially oriented polyester film having an average surface roughness of 10 to 120 nm, especially 10 to 40 nm can be produced by the addition of two kinds of calcium carbonate particles and aluminum silicate particles as mentioned above. A film having an average surface roughness of smaller than 10 nm has insufficient slipperiness and the winding of the film is difficult. When the average surface roughness is larger than 120 nm, the heat conduction is lowered in the high-speed printing with a thermal transfer printer to give an indistinct printed image.

A lubricant having particle diameter finer than that of the above two kinds of fine particles may be added as a third component in addition to the above fine particles provided that the produced film has the surface roughness falling within the above range.

A film incorporated with the above calcium carbonate and aluminum silicate has a number of protrusions originated from the fine particles on the surface of the film, and the number of protrusions having a height of 1.5 $\mu$m or over can be adjusted to 300 to 700/cm$^2$ by controlling the average particle diameter and the content of these fine particles. The slipperiness and the film-forming property can be compatibilized by setting the number of protrusions having a height of 1.5 $\mu$m or over within the above range.

The space factor of the biaxially oriented polyester film of the present invention can be adjusted to 1 to 19% by controlling the average particle diameter and the content of the fine particle. The slipperiness and the workability (handleability) of the film can be improved by setting the space factor within the range of 1 to 19%.

The space factor can be determined by a method similar to the method described in the section of spherical silica fine particle.

Among the biaxially oriented polyester films of the present invention, films containing the above calcium carbonate fine particles and aluminum silicate fine particles have excellent slipperiness and workability, suppressed void generation and low film breakage frequency in film-forming process according to the number of coarse particles in the film.

Thickness of Biaxially Oriented Polyester Film

The thickness of the biaxially oriented polyester film of the present invention is preferably from 0.5 to 10 $\mu$m. A film thicker than 10 $\mu$m takes a long time for the thermal conduction from a thermal head and is unsuitable for high-speed printing. On the other hand, a film having a thickness of thinner than 0.5 $\mu$m is also undesirable because such film has low strength and poor processing suitability and the strength is insufficient for thermal transfer ribbon.

Unevenness of Thickness of Biaxially Oriented Polyester Film

When the thickness of the biaxially oriented polyester film of the present invention is continuously measured to obtain a continuous thickness chart, the difference of heights between adjacent peak and valley (thickness difference) on the continuous thickness chart is within 8%, preferably within 5%, especially within 3% of the average thickness in both longitudinal and lateral directions. The distance between the adjacent peak and valley is 10 cm or longer on the continuous thickness chart.

The thickness unevenness in the total lateral direction is preferably 13% or less, more preferably 10% or less and the thickness unevenness in longitudinal direction per 5 m of the film is preferably 15% or less, more preferably 12% or less. The film satisfying the above condition has extremely uniform thickness to prevent the coating unevenness in the coating of an adhesiveness improving layer to be mentioned later. Furthermore, the film has an excellent effect to prevent the generation of coating unevenness in the coating of a thermal transfer ink layer.

The production of a film satisfying the above thickness unevenness range can be achieved by including the aforementioned sulfonic acid quaternary phosphonium salt to the polyester and intensively and closely contacting a molten film of the polyester with a chill roll in addition to the conventional thickness unevenness decreasing technique in the film-forming process. Especially, the thickness unevenness can be suppressed even by increasing the film-forming speed and, accordingly, a thermal transfer film free from the generation of coating unevenness in the application of an adhesiveness improving layer or a thermal transfer ink layer can be produced by optimizing the kind and addition amount of the sulfonic acid quaternary phosphonium salt.

The difference between the heights of adjacent peak and valley (thickness difference), the distance between a peak and a valley and the thickness unevenness on the continuous thickness chart can be determined by the following methods.

The thickness is continuously measured by an electronic micrometer in the longitudinal and lateral directions of a film over lengths of 5 m and 1 m, respectively, to obtain a continues thickness chart (thickness vs. position diagram), the maximum thickness, the minimum thickness and the thickness difference and distance between adjacent peak and valley are read out from the chart, and the above values are calculated by the following formula using an average thickness calculated from the width (cm), length (cm), weight (g) and density (g/cm$^3$) of the film.

Average thickness ($\mu$m)=[weight/(width×length×density)]×10000

Thickness unevenness (%)=[(maximum thickness−minimum thickness)/average thickness]×100

Thickness difference between adjacent peak and valley=[(thickness of peak−thickness of valley)/average thickness]×100

Orientation Angle

The biaxially oriented polyester film of the present invention preferably satisfies the following characteristic condition A. Furthermore, the stock film for the production of the biaxially oriented polyester film of the present invention preferably satisfies the following characteristic conditions B1 and B2.

A. The orientation angle in lateral direction is 75 degrees or more and 105 degrees or less, preferably 80 degrees or more and 100 degrees or less, more preferably 85 degrees or more and 95 degrees or less.

B1. The variation of the orientation angle in lateral direction is 0 dgree or more and 10 degrees or less per 1 m long.

B2. The overall orientation angle of the film excluding both edge parts having a width of 100 mm each is 75 degrees or more and 105 degrees or less, preferably 80 degrees or more and 100 degrees or less, especially 85 degrees or more and 95 degrees or less.

The orientation angles in A and B are measured by a molecular orientation meter using the lateral direction as 0 degree.

When a thermal transfer ribbon is produced from a film which does not satisfy the above characteristic condition B1, the direction of the orientation principal axis becomes considerably different from the tension (longitudinal direction) applied to the thermal transfer ribbon in printing and the problem of the generation of slant crease is liable to occur. In the characteristic condition B1, the variation of the orientation angle of close to 0 degree means the uniform orientation direction in the lateral direction and the state is most preferable. The variation of orientation angle cannot take a value of smaller than 0 degree.

The biaxially oriented polyester film of the present invention is produced by longitudinally drawing a sheet-formed undrawn film and then drawing in lateral direction in a tenter by gripping the edges of the film with clips and pulling the clip in the direction of the film width (lateral direction). The edge parts of the film gripped with the clips in the tenter are not subjected to sufficient biaxial drawing in the lateral drawing process. The edge parts of the film is called as "edge", cut off from the part for forming a stock film during the stage between the take-off from the tenter and the winding with a winder and, in most cases, crushed and reclaimed as a raw material.

However, the stock film obtained by removing the edge parts also has a distribution in the orientation of the principal orientation axis over the whole width.

The polyester film for thermal transfer use is a thin film and it is necessary to increase the Young's modulus in longitudinal direction to keep the strength in the production of the stock film. However, if the film of the present invention does not satisfy the above characteristic condition A or the stock film does not satisfy the above characteristic condition B2, the generation of crease is not improved even if the film has increased Young's modulus and only a small part at the center of the stock film can be utilized as the product for getting a film free from crease and, consequently, the productivity is lowered to an undesirable level.

The biaxially oriented polyester film of the present invention is preferably produced from a film obtained by removing the edge parts of the above stock film at a width of 100 mm each.

The characteristic range of the above orientation angle can be satisfied by optimizing the film-forming condition of the film. Particularly, it can be achieved by setting the longitudinal draw ratio to be larger than the lateral draw ratio and carrying out the lateral drawing in multiple stages. Concrete film-forming conditions are described later.

Young's Modulus

The Young's modulus of the biaxially oriented polyester film of the present invention preferably satisfies the following conditions (1) to (3).

(1) The Young's modulus in longitudinal direction (YMD) is 700 kg/mm$^2$ or more, preferably 750 kg/mm$^2$ or more, especially 780 kg/mm$^2$ or more.

(2) The Young's modulus in lateral direction (YTD) is 500 kg/mm$^2$ or more, preferably 550 kg/mm$^2$ or more, especially 600 kg/mm$^2$ or more.

(3) The Young's modulus ratio (YMD/YTD) is from 1.1 to 1.4.

If the Young's modulus in longitudinal direction is smaller than 700 kg/mm$^2$, crease is liable to generate by the tension applied to a thermal transfer ribbon in printing. A film having a lateral Young's modulus of smaller than 500 kg/mm$^2$ is also undesirable by the generation of crease owing to the shearing force applied to the film by a thermal head and a platen roll and, in extreme case, the ribbon is broken to cause jamming trouble.

A film having a Young's modulus ratio satisfying the above formula is preferable because the ribbon produced from the film is extended in well balanced state by the longitudinal tension applied to the ribbon and the lateral shearing force applied by the platen roll to decrease the creasing trouble. When the Young's modulus ratio is out of the above range, crease is liable to generate in the direction having low Young's modulus.

Heat Shrinkage

The biaxially oriented polyester film of the present invention preferably has an SMD/STD ratio of 0.8 or more and 1.3 or less, especially 0.9 or more and 1.2 or less wherein SMD and STD are heat shrinkage values in longitudinal direction and lateral direction after the heat-treatment at 200° C. for 10 minutes, respectively. A film having a heat shrinkage ratio falling within the above range is preferable because a thermal transfer ribbon produced from the film causes balanced shrinkage against the longitudinal tension applied to the ribbon when heat is applied from a thermal head in printing. When the heat shrinkage ratio is out of the above range, the balance of heat shrinkage to the tension is deteriorated and the film is extended in the direction having small heat shrinkage to cause the generation of crease.

Furthermore, the dimensional change caused by the shrinkage of the film by the friction of the film and the thermal head can be prevented by setting the heat shrinkage under the following heat-treatment condition to fall within the range shown below.

(i) The heat shrinkage values after the heat-treatment at 150° C. for 30 minutes are 3% or less, especially 2% or less in both longitudinal and lateral directions.

(ii) The heat shrinkage values after the heat-treatment at 200° C. for 10 minutes are 6% or less, especially 5% or less in both longitudinal and lateral directions.

(iii) The heat shrinkage values after the heat-treatment at 230° C. for 10 minutes are 10% or less, especially 6% or less in both longitudinal and lateral directions.

The film satisfying the above Young's modulus range and heat shrinkage range can be produced by using polyethylene-2,6-naphthalate as the polyester and optimizing the film-forming conditions, especially drawing conditions and heat-setting conditions.

Refractive Index

The refractive index (nz) in the thickness direction of the biaxially oriented polyester film of the present invention is preferably 1.493 or above, further 1.496 or above and 1.505 or below, especially 1.500 or below. A film having a refractive index in thickness direction of smaller than 1.493 is unpreferable owing to the deterioration of slitting workability. A film having a refractive index exceeding 1.505 has good slitting workability, however, it is also unpreferable owing to increased unevenness of thickness to deteriorate the flatness of the film.

The refractive index in longitudinal direction (nMD) is preferably 1.77 or above in the biaxially oriented polyester film of the present invention. A film having a longitudinal refractive index of smaller than 1.77 is undesirable as a thermal transfer ribbon because the film cannot resist the tension of a printer when the heat is applied to the film in printing and, in extreme case, the ribbon is broken to cause jamming trouble.

Density

The biaxially oriented polyester film of the present invention preferably has a density of 1.3500 g/cm$^3$ or over and 1.3599 g/cm$^3$ or below, more preferably 1.3530 g/cm$^3$ or over and 1.3596 g/cm$^3$ or below. When the density is smaller than the above lower limit, the film has low crystallinity and poor thermal dimensional stability. A film having a density larger than the above range is also undesirable because of excessively high crystallinity to cause the thickness unevenness and deteriorate the flatness.

Process for the Production of a Biaxially Oriented Polyester Film

The biaxially oriented polyester film of the present invention can be produced by biaxially drawing an undrawn film produced by the above method and heat-setting the biaxially drawn film. The heat-setting treatment is preferably carried out by the following method. The heat-setting is performed in two or more divided heat-setting zones (X1, X2 . . . ) by setting the temperature of the 1st heat-setting zone (X1) to (TSD+40)° C. or over and (TSD+100)° C. or below based on the drawing temperature (TSD, ° C.), providing a zone having a temperature higher than the temperature of the 1st zone among the heat-setting zones after the 1st zone and heat-setting the film while stretching the film in these heat-setting zones by 4 to 35%. The maximum temperature of the heat-setting zone is preferably 225° C. or above, especially 235° C. or above and 250° C. or below, and preferably the treatment in relaxed state or under tension is not performed after the zone having the maximum temperature.

Further preferable production conditions are described below. A polyester is melted and extruded through a slit die on a cooled rotary drum to form an undrawn film, biaxially drawn at a temperature not lower than the glass transition temperature (Tg, ° C.) of the polyester and not higher than (Tg+50)° C. at a draw ratio of 3.8 to 6.0, preferably 4.1 to 5.5 and more preferably 4.6 to 5.2 in longitudinal direction and 2.1 to 4.5 and preferably 2.8 to 4.0 in lateral direction and subjected to heat-setting treatment in the 1st zone (X1) among the two or more divided heat-setting zones (X1, X2, . . . ) at a temperature between (the lateral drawing temperature+40° C.) and (the lateral drawing temperature+100° C.), preferably between (the lateral drawing temperature+45° C.) and (the lateral drawing temperature+100° C.) for 1 to 50 seconds and the heat-setting treatment is continued in the other heat-setting zones. In the above process, the heat-setting is performed while stretching the film so as to increase the width of the film at the outlet of the final zone by 4 to 35% based on the film width at the inlet of the 1st heat-setting zone (X1). The stretching of the film may be carried out only in the 1st zone or in two or more continuing or separated zones.

In the case of performing a relaxed treatment, it is preferable to perform before the zone having maximum heat-setting temperature. The relaxed treatment is preferably carried out by contracting the width of the tenter in the middle of the heat-setting zones to relax the film in the direction of the film width by −5 to +5%.

The biaxially oriented polyester film of the present invention can be produced from the stock film produced under the above production conditions optionally by removing both edge parts, preferably edges of 100 mm width each, and slitting the film to a prescribed width. The film of the present invention satisfies the above-mentioned requirements on Young's modulus, heat shrinkage, refractive index in thickness direction, endothermic peak temperature other than melting point determined by a differential scanning calorimeter, density and orientation angle. A thermal transfer ribbon can be produced by applying a thermal transfer ink layer and a weld-preventing layer to be mentioned later to the film and slitting the coated film to a prescribed width.

Adhesiveness Improving Layer

A thermal transfer ribbon can be produced by applying a thermal transfer ink layer on one surface of the biaxially oriented polyester film of the present invention. In this case, it is preferable to form an adhesiveness improving layer between the substrate film and the thermal transfer ink layer to improve the adhesive force of both layers.

The adhesiveness improving layer is preferably a coating layer composed of at least one kind of water-soluble or dispersible resin selected from urethane resin, polyester resin, acrylic resin and polyester resin modified with vinyl resin.

The urethane resin constituting the adhesiveness improving layer is composed of, for example, the following valent hydroxy compounds, polyvalent isocyanate compound, chain extender and crosslinking agent. The valent hydroxy compound is, for example, polyethers such as polyoxyethylene glycol, polyoxypropylene glycol and polyoxytetramethylene glycol, polyesters such as polyethylene adipate, polyethylene-butylene adipate and polycaprolactone, polycarbonates, acrylic polyols and castor oil. The polyvalent isocyanate compound is, for example, tolylene diisocyanate, phenylene diisocyanate, 4,4'-diphenylmethane diisocyanate, hexamethylene diisocyanate, xylylene diisocyanate, 4,4'-dicyclohexylmethane diisocyanate and isophorone diisocyanate. Examples of chain extender or crosslinking agent are ethylene glycol, propylene glycol, diethylene glycol, trimethylolpropane, hydrazine, ethylenediamine, diethylenetriamine, ethylenediamine-sodium acrylate adduct, 4,4'-diaminodiphenylmethane, 4,4'-diaminodicyclohexylmethane and water. One or more compounds are properly selected from each of these compounds and a urethane resin is synthesized by conventional polycondensation-crosslinking reaction.

The following polybasic carboxylic acid and polyvalent hydroxyl compound can be exemplified as the constituent components of a polyester resin constituting the adhesiveness improving layer. The polybasic carboxylic acids usable as the constituent are terephthalic acid, isophthalic acid, orthophthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassium sulfoterephthalic acid, 5-sodium sulfoisophthalic acid, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid, trimellitic acid monopotassium salt and their ester-forming derivatives, etc., and the polyvalent hydroxy compounds usable as the constituent are ethylene glycol, 1,2-propylene glycol, 1,3-propylene glycol, 1,4-butanediol, 1,6-hexanediol, 2-methyl-1,5-pentanediol, neopentyl glycol, 1,4-cyclohexanedimethanol, p-xylylene glycol, bisphenol-A ethylene glycol adduct, bisphenol-A 1,2-propylene glycol adduct, diethylene glycol, triethylene glycol, polyethylene glycol, polypropylene glycol, polytetramethylene glycol, polytetramethylene oxide glycol, dimethylol propionic acid, glycerol, trimethylolpropane, dimethylolethylsulfonic acid sodium salt, dimethylolpropionic acid potassium salt, etc. One or more compounds are properly selected from each of these compound groups and a polyester is synthesized by conventional polycondensation reaction. In addition to the polyesters explained above, a composite polymer having a polyester component such as a polyester polyurethane produced by extending the chain of a polyester polyol with an isocyanate is also included in the category of the polyester resin of the present invention.

The acrylic resin constituting the adhesiveness improving layer preferably contains an alkyl acrylate or an alkyl methacrylate as a main component and is a water-soluble or water-dispersible resin containing 30 to 90 mol % of the acrylate component and 70 to 10 mol % of a copolymerizable vinyl monomer component having a functional group. The vinyl monomer copolymerizable with alkyl acrylate or alkyl methacrylate and having a functional group is a vinyl monomer having carboxyl group or its salt, acid anhydride group, sulfonic acid group or its salt, amide group or alkylolated amide group, amino group (including substituted amino group) or alkylolated amino group or their salt, hydroxyl group, epoxy group, etc., as the functional group. Especially preferable groups among the above groups are carboxyl group or its salt, acid anhydride group and epoxy group. The resin may contain two or more kinds of the above groups. Examples of the alkyl group of the alkyl acrylate or alkyl methacrylate are methyl group, ethyl group, n-propyl group, isopropyl group, n-butyl group, isobutyl group, t-butyl group, 2-ethylhexyl group, lauryl group, stearyl group and cyclohexyl group.

The following compounds having functional group such as reactive functional group, self-crosslinking functional group and hydrophilic group can be used as the vinyl monomer having a functional group copolymerizable with alkyl acrylate or alkyl methacrylate. Examples of the compound having carboxyl group, its salt or an acid anhydride group are acrylic acid, methacrylic acid, itaconic acid, maleic acid, metal salt such as sodium salt or ammonium salt of these carboxylic acids and maleic anhydride. Examples of the compound having sulfonic acid group or its salt are vinylsulfonic acid, styrenesulfonic acid, and metal salt such as sodium salt or ammonium salt of these sulfonic acids. Examples of the compound having amide group or alkylolated amide group are acrylamide, methacrylamide, N-methyl methacrylamide, methylolated acrylamide, methylolated methacrylamide, ureidovinyl ether, β-ureidoisobutyl vinyl ether and ureidoethyl acrylate. Examples of the compound having amino group, alkylolated amino group or their salts are diethylaminoethyl vinyl ether, 2-aminoethyl vinyl ether, 3-aminopropyl vinyl ether, 2-aminobutyl vinyl ether, dimethylaminoethyl methacrylate, dimethylaminoethyl vinyl ether, compounds produced by methylolating the amino group of the above exemplified compounds, and compounds produced by quaternarizing the above exemplified compounds with an alkyl halide, dimethyl sulfate, sultone, etc. Examples of the compound having hydroxyl group are β-hydroxyethyl acrylate, β-hydroxyethyl methacrylate, β-hydroxypropyl acrylate, β-hydroxypropyl methacrylate, β-hydroxyethyl vinyl ether, 5-hydroxypentyl vinyl ether, 6-hydroxyhexyl vinyl ether, polyethylene glycol monoacrylate, polyethylene glycol monomethacrylate, polypropylene glycol monoacrylate and polypropylene glycol monomethacrylate. Glycidyl acrylate and glycidyl methacrylate are exemplified as the compound having epoxy group. The other compounds having functional group are, for example, vinyl isocyanate and allyl isocyanate. In addition to the above, olefins such as ethylene, propylene, methylpentene, butadiene, styrene and α-methylstyrene, vinyl methyl ether, vinyl ethyl ether, vinyltrialkoxysilane, acrylonitrile, methacrylonitrile, vinylidene chloride, vinyl chloride, vinylidene fluoride, tetrafluoroethylene and vinyl acetate can be used as the vinyl monomer compound.

The polyester resin modified with a vinyl resin and constituting the adhesiveness improving layer can be synthesized by polymerizing a vinyl resin in a water-soluble or water-dispersible polyester resin. The following polybasic acid or its ester-forming derivative and a polyol or its ester-forming derivative are examples of the components constituting the polyester. Examples of the polybasic acid component are terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid and dimer acid. A copolymerized polyester resin is synthesized by using two or more kinds of these acid components. The polybasic acid component may contain small amounts of an unsaturated polybasic acid such as maleic acid and itaconic acid and a hydroxycarboxylic acid such as p-hydroxybenzoic acid. Examples of the polyol component are ethylene glycol, 1,4-butanediol, diethylene glycol, dipropylene glycol, 1,6-hexanediol, 1,4-cyclohexanedimethanol, xylene glycol, dimethylolpropane, poly(ethylene oxide)glycol and poly(tetramethylene oxide)glycol. Two or more kinds of these polyol components may be used in combination. The vinyl monomers exemplified below can be used as the vinyl resin component. The vinyl monomers are alkyl acrylate, alkyl methacrylate (the alkyl group is methyl group, ethyl group, n-propyl group, isopropyl group, n-butyl group, isobutyl group, t-butyl group, 2-ethylhexyl group, cyclohexyl group, etc.), hydroxy-containing monomers such as 2-hydroxyethyl acrylate, 2-hydroxyethyl methacrylate, 2-hydroxypropyl acrylate and 2-hdyroxypropyl methacrylate, amide-containing monomers such as acrylamide, methacrylamide, N-alkylacrylamide, N-alkylmethacrylamide, N,N-diallylacrylamide, N,N-dialkyl methacrylamide (the alkyl group is methyl group, ethyl group, n-propyl group, isopropyl group, n-butyl group, isobutyl group, t-butyl group, 2-ethylhexyl group, cyclohexyl group, etc.), N-alkoxyacrylamide, N-alkoxymethacrylamide, N,N-dialkoxyacrylamide, N,N-dialkoxymethacrylamide (the alkoxy group is methoxy group, ethoxy group, butoxy group, isobutoxy group, etc.), N-methylolacrylamide, N-methylolmethacrylamide, N-phenylacrylamide and N-phenylmethacrylamide, epoxy-containing monomers such as glycidyl acrylate, glycidyl methacrylate and allyl glycidyl ether, monomers containing carboxyl group or its salt such as acrylic acid, methacrylic acid, itaconic acid, maleic acid, fumaric acid, crotonic acid, styrenesulfonic acid and its salt (sodium salt, potassium salt, ammonium salt, tertiary amine salt, etc.), acid anhydride monomers such as maleic anhydride and itaconic anhydride, and other monomers such as vinyl isocyanate, allyl isocyanate, styrene, α-methylstyrene, vinyl methyl ether, vinyl ethyl ether, vinyltrialkoxysilane, alkylmaleic acid monoester, alkylfumaric acid monoester, alkylitaconic acid monoester, acrylonitrile, methacrylonitrile, vinylidene chloride, ethylene, propylene, vinyl chloride, vinyl acetate and butadiene. The above monomers are cited as examples and the present invention is not restricted to the exemplified monomers. One or more kinds of these monomers may be used for copolymerization.

The coating liquid constituting the adhesiveness improving layer may contain a small amount of an organic solvent unless the solvent exerts influence on the above resin and other additives. The coating liquid may be incorporated with a necessary amount of a surfactant such as anionic surfactant, cationic surfactant and nonionic surfactant. Preferable surfactants are those capable of lowering the surface tension of the aqueous coating liquid to 40 dyne/cm or below to promote the wetting of the polyester film with the coating liquid. Preferable examples of the surfactant are polyoxyethylene alkylphenyl ether, polyoxyethylene-fatty acid ester, sorbitan fatty acid ester, glycerol fatty acid ester, fatty acid metal soap, alkylsulfuric acid salt, alkylsulfonic acid salt, alkylsulfosuccinic acid salt, quaternary ammonium chloride salt, alkylamine hydrochloride and betaine-type surfactant.

The adhesiveness improving layer in the present invention may contain a crosslinking agent such as isocyanate compound, epoxy compound, oxazoline compound, aziridine compound, melamine compound, silane coupling agent, titanium coupling agent, zircoaluminate coupling agent, etc., for improving the sticking property (blocking property), water-resistance, solvent resistance and mechanical strength. When the resin component of the adhesiveness improving layer has crosslinking reaction points, it may contain a reaction initiator such as peroxide and amine or a photo-sensitizer for photosensitive resin, etc. The adhesiveness improving layer may contain inorganic fine particles such as silica, silica sol, alumina, alumina sol, zirconium sol, kaolin, talc, calcium carbonate, calcium phosphate, titanium oxide, barium sulfate, carbon black, molybdenum sulfide and antimony oxide sol or organic fine particles such as polystyrene, polyethylene, polyamide, polyester, polyacrylic acid ester, epoxy resin, silicone resin and fluororesin to improve the sticking property and the slipperiness. The layer may be further incorporated as necessary with defoaming agent, coatability improving agent, thickener, antistatic agent, organic lubricant, antioxidant, foaming agent, dye, pigment, etc.

The coating liquid to form the adhesiveness improving layer is applied to one or both surfaces of the film preferably before completing the crystal orientation in the film-forming process. Although the coating process may be separated from the film-forming process, the coating film is liable to be contaminated with dust particles in this case and the contaminated part may form a defect in printing. The application of an adhesiveness improving layer by the above method is effective for forming a thin adhesiveness improving layer having high thickness uniformity at a relatively low cost. The solid concentration of the coating liquid is usually 0.1 to 30% by weight, more preferably 1 to 10% by weight. The coating amount is preferably 0.5 to 50 g per 1 $m^2$ of the moving film.

Thermal Transfer Ink Layer

A thermal transfer ribbon can be produced by forming a thermal transfer ink layer on at least one surface, especially only one surface of the biaxially oriented polyester film of the present invention. There is no particular restriction on the kind of the thermal transfer ink layer and known ink can be used for the purpose. More specifically, the ink layer is produced by using a binder component, a coloring component, etc., as main components and optionally adding proper amounts of a softener, a plasticizer, a dispersing agent, etc. Concrete examples of the main components are known waxes such as carnauba wax or paraffin wax, cellulose, polyvinyl alcohol, partially acetalized polyvinyl alcohol, polyamide, various polymeric substances having low melting point, etc., as the binder component, and the coloring agent contains carbon black as a main component and additionally various kinds of dyes or organic or inorganic pigments. The thermal transfer ink layer may contain sublimable dye. Various disperse dyes, basic dyes, etc., can be used as the sublimable dye.

The thermal transfer ink layer can be formed by conventional method, for example by hot-melt coating or a solution coating such as gravure, reverse or slit-die coating of the ink added with a solvent. The thermal transfer ink layer is formed on the biaxially oriented polyester film preferably on the face having the adhesiveness improving layer.

Weld Prevention Layer

It is preferable to form a weld prevention layer on the surface opposite to the thermal transfer ink layer of the above thermal transfer ribbon to prevent the sticking of a thermal head. The weld prevention layer is preferably composed of a silicone resin, polymer produced by crosslinking an acrylate, a methacrylate or its polyester copolymer having crosslinkable functional group with an isocyanate, an epoxy compound, melamine, etc., a fluororesin, a silicone oil, a mineral oil, etc. The weld prevention layer can be formed by applying a coating liquid containing the above components, and the coating process may be performed before completing the crystal orientation of the film or to a biaxially oriented film in off-line state. The thermal history of the film in the processing to a transfer ribbon can be decreased by this process to obtain a film resistant to creasing.

Known processes can be used for the coating. For example, roll-coating method, gravure coating method, roll brush method, spray-coating method, air-knife coating method, impregnation method, curtain coating method, etc., is used singly or in combination.

EXAMPLES

The present invention is described in more detail by the following examples.

Various physical properties and characteristics cited in the present invention are determined and defined by the methods described below.

(1) Film-forming Property

A wire electrode was stretched parallel to the film near the die for extruding a molten polymer in the form of a film and a voltage of 7,000 V was applied to the electrode. The film-formed molten polymer was extruded keeping the above state and closely contacted with a chill drum to continuously form a film. The film-forming behavior of the film was observed and evaluated by the following criteria.

Rank A: There is no breakage of the film to enable extremely stable film-forming.

Rank B: The breakage of film seldom occurs to enable stable film-forming.

Rank C: Occasional film breakage causes unstable film-forming.

Rank D: Stable film-forming is essentially impossible owing to frequent film breakage.

(2) Alternative Current Volume Resistivity

The resistivity was measured by using an instrument shown in the FIG. 1. The specimen for measurement was prepared by stacking film pieces to a thickness of about 150 μm. An upper electrode 3 having a diameter of 5.6 cm and a thickness of 0.2 cm was placed above a cylindrical lower electrode 2 having a diameter of 20 cm interposing a parallel gap of 150 μm thick between both electrodes, and the specimen was inserted between the electrodes in a manner to closely contact the specimen with both electrodes.

A heating device 4 and a temperature detection terminal 5 were built in the lower electrode to suppress the variation of the surface temperature of the lower electrode within 1° C. on the measurement surface and keep the temperature difference between the surface temperature and the detection terminal to 2° C. or smaller at a heating rate of 8° C./min. The detected temperature was read out by a reading thermometer 7. The whole electrodes were placed in a heat-insulation box 11.

Voltage generated by a power source 8 was applied to both electrodes through a standard resistor 9. A DC voltage of 100V was generated by the power source in the case of measuring the direct current volume resistivity of the film or 100V 50 Hz AC was generated in the case of measuring the alternate current volume resistivity of the film. The electric current flowing through the circuit was measured by reading the voltage generated at both ends of the standard resistor 9 with an electron meter 10 having an internal impedance of 100 M Ω or above.

In the present invention, the measurement of the alternate current volume resistivity of the molten film was carried out by using the above instrument at a heating rate of the lower electrode of 8° C./min and a lower electrode temperature higher than the melting point of the polymer determined by a differential scanning calorimeter (DSC) by 20° C. (290° C. for polyethylene-2,6-naphthalate), and the alternate current volume resistivity Z was calculated from the applied voltage E, current I, electrode area S and electrode gap (d) by the following formula.

$$Z=(E/I)\times(S/d)$$

(3) Refractive Index

The refractive index was measured with an Abbe's refractometer using NaD line (589 nm) as the light source and calculated by the following formula. In the formula, nz is the refractive index in the direction perpendicular to the film surface (thickness direction) and nMD is the refractive index in the longitudinal direction of the film (4) Heat-shrinkage Film specimens were maintained in ovens set to various temperatures (150, 200 and 230° C.) in relaxed state for various preset periods (30 min for 150° C. and 10 min for 200 and 230° C.) and the dimensional change before and after the heat-treatment was defined as the heat-shrinkage and calculated by the following formula.

$$\text{Heat-shrinkage }\%=((L_0-L)/L_0)\times 100$$

$L_0$: Distance between gauge marks before heat-treatment

L: Distance between gauge marks after heat-treatment (5) Density

Density was measured by a sink-float method at 25° C. in a density gradient tube containing an aqueous solution of calcium nitrate.

(6) Thickness and Thickness Unevenness of Film

The thickness of a film was measured by using an electronic micrometer (manufactured by Anritsu Corp., type K-312A) over distances of 5 m and 1 m in the longitudinal and lateral directions of the film, respectively, at a stylus pressure of 30 g and a moving speed of 25 mm/sec to obtain a continuous thickness chart. The maximum thickness, the minimum thickness and the thickness difference between the adjacent peak and valley were read out from the chart. The width (cm), length (cm), weight (g) and density (g/cm$^3$) were measured on the same specimen and the average thickness (μm) was calculated by the following formula. The ratio of the difference between the maximum thickness and the minimum thickness to the average thickness was calculated by the following formula and used as the thickness unevenness, and the ratio of the thickness difference between the adjacent peak and valley to the average thickness was calculated by the following formula.

$$\text{Average thickness } (\mu m)=[\text{weight}/(\text{width}\times\text{length}\times\text{density})]\times 10000$$

$$\text{Thickness unevenness } (\%)=[(\text{maximum thickness}-\text{minimum thickness})/\text{average thickness}]\times 100$$

$$\text{The ratio of thickness difference between adjacent peak and valley to average thickness}=[(\text{peak thickness}-\text{valley thickness})/\text{average thickness}]\times 100$$

(7) Center-line Average Roughness (Ra)

The roughness of the front and back surfaces of a film was measured by a surface roughness tester (manufactured by Tokyo Seimitsu Co., Ltd., SURFCOM 111A) and the average value was defined as the surface roughness.

(8) Space Factor

The space factor was calculated by the following formula.

$$SF(\%)=100-t^1/t^{2\times 100}$$

wherein $t^1$ (μm) was the weight-average thickness calculated from the weight w (g) of a specimen film having an area of 100 cm$^2$ and its density d (g/cm$^3$), and $t^2$ (μm) is the thickness of a single specimen film measured by a micrometer.

(9) Endothermic Subpeak Temperature (°C.)

Ten (10) mg of a film was set on a thermoanalyzing system (differential scanning calorimeter) SSC5200, DSC220 manufactured by Seiko Instruments Inc., heated in nitrogen stream at a heating rate of 20° C./min and the endothermic behavior of the film was analyzed by first order differentiation and second order differentiation to determine the temperatures corresponding to endothermic peaks. Among the determined temperatures, the temperature lower than the melting point was defined as the endothermic subpeak temperature. Different from the melting point peak, the endothermic peak is caused by the partial melting of the structure formed by heat-setting.

(10) Adhesivity

A mending tape manufactured by Sumitomo 3M Ltd. (#810) was pasted on the ink layer surface of the prepared thermal transfer ribbon and peeled off at a stroke. The adhesivity was evaluated by the following criterion according to the extent of the peeled ink layer.

5: Absolutely no peeling of ink layer

4: Area of peeled ink layer was smaller than 10%.

3: Area of peeled ink layer was not smaller than 10% and smaller than 30%.

2: Area of peeled ink layer was not smaller than 30% and smaller than 80%.

1: Area of peeled ink layer was 80% or more.

(11) Printing Quality

A test printing was performed on an image-receiving sheet VY·200 (product of Hitachi, Ltd., standard paper, commercial name) with a printer (Hitachi VY·200, manufactured by Hitachi, Ltd., commercial name) at the maximum optical density. The printing quality and the crease formed on the ribbon were evaluated on the produced thermal transfer ribbon according to the following criterion.

○: Printed image was clear.

Δ: The printed image had non-uniform density.

×: The ribbon was creased to distort the printed image.

(12) Diameter of the Particle

A. Particle Diameter of Powder

Particle diameter was measured by using a centrifugal particle size analyzer Type CP-50 manufactured by Shimadzu Corp. The particle diameter corresponding to 50 mass % was read out from a cumulative curve showing the particles of various diameters and their contents and prepared from the centrifugal precipitation curve obtained by the above measurement (refer to "Particle Size Determination Technique", published by Nikkan Kogyo Shimbun, Ltd., 1975, pp.242–247) and the value was used as the average diameter.

B. Diameter of Particle in a Film

A small piece of specimen film was fixed to a specimen holder for a scanning electron microscope and the surface of the film was subjected to ion etching treatment for 10 min using a sputtering apparatus manufactured by JEOL Ltd. (Type JIS-1100 ion sputtering apparatus) in a vacuum of $1\times10^{-3}$ torr under the condition of 0.25 kV and 1.25 mA. Further, gold was sputtered by using the same apparatus, the sputtered surface was observed by a scanning electron microscope at a magnification of ×10,000–30,000, and the major diameter (Dli), the minor diameter (Dsi) and the area-equivalent diameter (Di) were measured on at least 100 particles by using Rousex 500 manufactured by Nihon Regulator Co., Ltd. The number-average value of the area-equivalent particle diameter was used as the average particle diameter (D).

(13) Particle Diameter Ratio

The average values (Dl, Ds) were calculated respectively from the major diameter (Dli) and the minor diameter (Dsi) obtained by the above section and the ratio (Dl/Ds) was defined as the particle diameter ratio. (14) Number of protrusions having height of 1.5 μm or over The height of a protrusion was measured by using a double-beam microscope OPTIPHOTO manufactured by Nikon Corp. (the wavelength λ=546 nm) taking advantage of the fact that one interference fringe accounts for 2/λ, and the protrusions of 1.5 μm high or over existing in 1 $cm^2$ were counted.

(15) Windability

A formed base film was slit to a prescribed width and the extent of generated crease was observed and evaluated by the following criterion.

Rank A: Free from crease and extremely stably windable

Rank B: Little generation of crease to enable stable winding

Rank C: Occasional generation of crease to disable the stable winding

Rank D: Frequent generation of large crease and stable winding is essentially impossible.

(16) Orientation Degree (Variation of Orientation Angle and Orientation Angle in Lateral Direction) by Molecular Orientation Tester A plot of an orientation ellipsoid of the microwave intensity of a film was obtained by using a molecular orientation tester MOA-2001A manufactured by Shin-Oji Paper Co., Ltd. The angle between the lateral direction and the minor axis of the orientation ellipsoid was defined as the orientation angle taking the lateral direction as 0 degree. The variation of the orientation angle of the base film was measured on the part excluding both edge parts of 100 mm wide from the base film, and expressed by the variation per 1 m width. The orientation angle in lateral direction was measured on the part excluding both edge parts of 100 mm wide from the base film, and expressed by the maximum value and the minimum value of the orientation angle.

(17) Young's Modulus

A film was cut to 10 mm wide and 15 cm long, and the obtained specimen was pulled by an Instron-type universal tensile tester at the initial chuck distance of 100 mm, a pulling rate of 10 mm/min and a chart speed of 500 mm/min, and the Young's modulus was calculated from the tangent line of the rising part of the obtained stress-elongation curve.

Examples 1 to 6 and Comparative Examples 1 to 4

A mixture of 100 parts by weight of dimethyl 2,6-naphthalenedicarboxylate and 60 parts by weight of ethylene glycol was added with 0.03 part by weight of manganese acetate tetrahydrate and subjected to transesterification reaction by slowly heating the system from 150° C. to 240° C. When the reaction temperature reached 170° C., 0.024 part by weight of antimony trioxide and then 0.4 part by weight of spherical silica particles having an average particle diameter of 1.2 μm were added to the system and, when the reaction temperature reached 220° C., sulfonic acid quaternary phosphonium salts shown in Tables 1 and 2 were added to the system in amounts shown in Tables 1 and 2 in the form of a solution produced by adding the phosphonium salt to 0.124 part by weight of ethylene glycol and heating the mixture at 40° C. Subsequently, the system was subjected to transesterification reaction and, after the reaction, added with a solution (0.023 part by weight in terms of trimethyl phosphate) produced by heat-treating trimethyl phosphate in ethylene glycol at 135° C. for 5 hours under a pressure of 1.1 to 1.6 $kg/cm^2$. The reaction product was transferred to a polymerization reactor, heated to 290° C., and subjected to polycondensation reaction under a high vacuum of 0.2 mmHg or below to obtain a copolymerized polyethylene-2,6-naphthalate having an intrinsic viscosity of 0.62 measured in o-chlorophenol at 25° C.

The copolymerized polyethylene-2,6-naphthalate was melted and extruded with an extruder and a T-die in the form of a sheet and brought into close contact with a water-cooled casting drum at a speed of 37.5 m/min to effect the cooling and solidification and obtain an undrawn sheet. The undrawn film was drawn by roll drawing in longitudinal direction (machine direction) at 144° C. at a speed of 150 m/min at the high-speed roll side at draw ratios shown in the Tables 1 and 2.

A coating agent having the following composition was applied as a weld-prevention layer with a gravure coater to a dried coating film thickness of 0.5 μm to the longitudinally drawn film at a side not to apply an ink layer. The face to apply an ink layer was coated with a coating agent having the following composition as an adhesiveness improving layer with a gravure coater to a dried coating film thickness of 0.1 μm. The coated film was subjected to successive biaxial drawing in lateral direction (transversal direction) at 140° C. at ratios shown in the Tables 1 and 2, heat-set in the 1st, 2nd and 3rd heat-setting zones at temperatures shown in the Tables 1 and 2 for 2 seconds each, and heat-set in lateral direction in the 3rd heat-setting zone under tension under the conditions shown in the Tables 1 and 2 to obtain biaxially oriented films having thickness shown in the Tables 1 and 2.

[Composition of Coating Agent for Weld-prevention Layer]

| | |
|---|---|
| Acrylic acid ester | 14.0wt.% |
| Amino-modified silicone | 5.9wt.% |
| Isocyanate | 0.1wt.% |
| Water | 80.0wt.% |

[Composition of Coating Agent for Adhesiveness Improving Layer (acryl+Polyester+Epoxy)]

Acrylic resin: 42 wt. % (solid basis)

(methyl methacrylate 65 mol %/ethyl acrylate 28 mol %/2-hydroxyethyl methacrylate 2 mol %/N-methylolacrylamide 5 mol %)

Polyester resin: 42 wt. % (solid basis)

(Acid component: terephthalic acid 35 mol %/isophthalic acid 13 mol %/5-sodium sulfoisophthalate 2 mol % Glycol component: ethylene glycol 45 mol %/diethylene glycol 5 mol %).

Epoxy-based crosslinking agent: 6 wt. % (solid basis)

(N,N,N',N'-tetraglycidyl-m-xylylenediamine)

Wetting agent: 10 wt. % (solid basis)

(Lauryl polyoxyethylene)

The alternate current volume resistivity, refractive index, endothermic subpeak temperature, longitudinal and lateral heat-shrinkages, orientation degree, density, thickness and space factor were measured and evaluated on the obtained biaxially oriented PEN film.

A thermal transfer ink having the following composition was applied to the film at a side opposite to the weld-prevention layer with a gravure coater to a coating film thickness of 1.0 μm to obtain a thermal transfer ribbon.

[Composition of Thermal Transfer Ink]

| | |
|---|---|
| Magenta dye (MS Red G) | 3.5wt.% |
| Polyvinyl acetoacetal resin | 3.5wt.% |
| Methyl ethyl ketone | 46.5wt.% |
| Toluene | 46.5wt.% |

The adhesivity of the ink and the printing performance were evaluated on the produced thermal transfer ribbon. The evaluation results are shown in the Tables 1 and 2.

The notations in the Tables 1 and 2 are explained as follows.

Others * : One cleaning operation per 6 hours is necessary owing to the staining of the casting drum.

Quaternary phosphonium salt A: 3,5-dicarboxybenzenesulfonic acid tetrabutylphosphonium salt Quaternary phosphonium salt B: 3,5-dicarboxybenzenesulfonic acid tetraphenylphosphonium salt The sign "–" in the column of relaxed treatment means the treatment under tension.

TABLE 1

| | | Example 1 | Example 2 | Example 3 | Example 4 | Example 5 | Example 6 |
|---|---|---|---|---|---|---|---|
| Film forming condition | | | | | | | |
| Main component | | PEN | PEN | PEN | PEN | PEN | PEN |
| Quaternary phosphonium salt | | A | A | A | A | B | A |
| amount | pt. wt. | 0.042 | 0.01 | 0.037 | 0.042 | 0.048 | 0.041 |
| amount | mmol % | 2 | 0.5 | 18 | 2 | 2 | 2 |
| Longitudinal draw ratio | times | 4 | 4 | 4 | 4 | 4 | 4.5 |
| Lateral draw ratio | times | 4 | 4 | 4 | 4 | 4 | 4.5 |
| 1st heat-setting | ° C. | 200 | 180 | 200 | 200 | 200 | 200 |
| 2nd heat-setting | ° C. | 230 | 230 | 230 | 228 | 230 | 230 |
| 3rd haat-setting | ° C. | 240 | 240 | 240 | 230 | 240 | 240 |
| Relaxed treatment (in 3rd heat-setting) | % | −2 | −2 | −2 | −2 | −2 | −3 |
| Physical property | | | | | | | |
| Base film thickness | μm | 3 | 3 | 3 | 3 | 3 | 2 |
| AC volume resistivity | $10^8$ Ω cm | 1 | 2 | 0.1 | 1 | 1.2 | 1 |
| Refractive index (thickness direction) | — | 1.498 | 1.498 | 1.498 | 1.495 | 1.498 | 1.496 |
| Endothermic subpeak temperature | ° C. | 240 | 240 | 240 | 230 | 240 | 240 |
| Heat shrinkage (150° C.) longitudinal direction | % | 1.0 | 1.0 | 1.0 | 1.6 | 1.0 | 1.3 |
| lateral direction | % | 1.0 | 1.0 | 1.0 | 1.6 | 1.0 | 1.4 |
| Heat shrinkage (200° C.) | % | 3.5 | 3.5 | 3.5 | 4.0 | 3.5 | 4.5 |

TABLE 1-continued

| | | Example 1 | Example 2 | Example 3 | Example 4 | Example 5 | Example 6 |
|---|---|---|---|---|---|---|---|
| longitudinal direction | | | | | | | |
| lateral direction | % | 3.5 | 3.5 | 3.5 | 4.2 | 3.5 | 4.6 |
| Heat shrinkage (230° C.) longitudinal direction | % | 5.0 | 5.0 | 5.0 | 6.0 | 5.0 | 6.3 |
| lateral direction | % | 5.0 | 5.0 | 5.0 | 6.2 | 5.0 | 6.5 |
| Density | g/cm$^3$ | 1.358 | 1.358 | 1.358 | 1.355 | 1.358 | 1.357 |
| Space factor | % | 15 | 15 | 15 | 15 | 15 | 15 |
| Film-forming property | | A | A | A | A | A | A |
| Adhesivity | | 5 | 5 | 5 | 5 | 5 | 5 |
| Printing performance | | ○ | ○ | ○ | ○ | ○ | ○ |
| Others | | | | | | | |

TABLE 2

| | | Comparative Example 1 | Comparative Example 2 | Comparative Example 3 | Comparative Example 4 |
|---|---|---|---|---|---|
| Film forming condition | | | | | |
| Main component | | PEN | PEN | PEN | PEN |
| Quaternary phosphonium salt | | None | A | A | None |
| amount | pt. wt. | | 0.0002 | 1 | |
| amount | mmol % | | 0.01 | 50 | |
| Longitudinal draw ratio | times | 4 | 4 | 4 | 4 |
| Lateral draw ratio | times | 4 | 4 | 4 | 4 |
| 1st heat-setting | ° C. | 200 | 200 | 200 | 200 |
| 2nd heat-setting | ° C. | 230 | 230 | 230 | 215 |
| 3rd heat-setting | ° C. | 240 | 240 | 240 | 220 |
| Relaxed treatment (in 3rd heat-setting) | % | −2 | −2 | −2 | −2 |
| Physical property | | | | | |
| Base film thickness | μm | 3 | 3 | 3 | 3 |
| AC volume resistivity | $10^8$ Ω cm | 8 | 7 | 0.09 | 8 |
| Refractive index (thickness direction) | — | 1.498 | 1.498 | 1.498 | 1.492 |
| Endothermic subpeak temperature | ° C. | 240 | 240 | 240 | 220 |
| Heat shrinkage (150° C.) longitudinal direction | % | 1.0 | 1.0 | 1.0 | 1.8 |
| lateral direction | % | 1.0 | 1.0 | 1.0 | 1.8 |
| Heat shrinkage (200° C.) longitudinal direction | % | 3.5 | 3.5 | 3.5 | 6.5 |
| lateral direction | % | 3.5 | 3.5 | 3.5 | 6.8 |
| Heat shrinkage (230° C.) longitudinal direction | % | 5.0 | 5.0 | 5.0 | 11.0 |
| lateral direction | % | 5.0 | 5.0 | 5.0 | 11.5 |
| Density | g/cm$^3$ | 1.358 | 1.358 | 1.358 | 1.352 |
| Space factor | % | 15 | 15 | 15 | 15 |
| Film-forming property | | D | C | A | D |
| Adhesivity | | 5 | 5 | 5 | 5 |
| Printing performance | | ○ | ○ | ○ | Δ |
| Others | | | | * | |

Examples 7 to 10 and Comparative Example 5

A mixture of 100 parts by weight of dimethyl terephthalate and 60 parts by weight of ethylene glycol was added with 0.024 part by weight of manganese acetate tetrahydrate and subjected to transesterification reaction by slowly heating the system from 150° C. to 240° C. When the reaction temperature reached 170° C., 0.019 part by weight of antimony trioxide and then 0.3 part by weight of spherical silica particles having an average particle diameter of 1.2 μm were added to the system and, when the reaction temperature reached 220° C., sulfonic acid quaternary phosphonium salts shown in Table 3 were added to the system in amounts shown in Table 3 in the form of a solution produced by adding the phosphonium salt to ethylene glycol and heating the mixture at 40° C. (There was no addition of the sulfonic acid quaternary phosphonium salt in the Comparative Example 5).

Subsequently, the system was subjected to transesterification reaction and, after the reaction, added with a solution (0.018 part by weight in terms of trimethyl phosphate) produced by heat-treating trimethyl phosphate in ethylene glycol at 135° C. for 5 hours under a pressure of 1.1 to 1.6 kg/cm$^2$. The reaction product was transferred to a polymerization reactor, heated to 290° C., and subjected to polycondensation reaction under a high vacuum of 0.2 mmHg or below to obtain a copolymerized polyethylene terephthalate polymer having an intrinsic viscosity of 0.62 measured in o-chlorophenol at 25° C.

The copolymerized polyethylene terephthalate polymer was melted and extruded with an extruder and a T-die in the form of a sheet and brought into close contact with a water-cooled casting drum at a speed of 37.5 m/min to effect the cooling and solidification and obtain an undrawn sheet. The undrawn film was drawn by roll drawing in longitudinal direction (machine direction) at 105° C. at a speed of 150 m/min at the high-speed roll side at draw ratios shown in the Table 3.

A coating agent having the composition same as that of the Example 1 was applied as a weld-prevention layer with a gravure coater to a dried coating film thickness of 0.5 μm to the longitudinally drawn film at a side not to apply an ink layer. The face to apply an ink layer was coated with a coating agent having the composition same as that of the Example 1 as an adhesiveness improving layer with a gravure coater to a dried coating film thickness of 0.1 μm. The coated film was subjected to successive biaxial drawing in lateral direction (transversal direction) at 110° C. at ratios shown in the Table 3, heat-set in the 1st, 2nd and 3rd heat-setting zones at temperatures shown in the Table 3 for 2 seconds each, while relaxing (stretching) the film in lateral direction in the 3rd heat-setting zone under the conditions shown in the Table 3 to obtain biaxially oriented films having thickness shown in the Table 3.

The alternate current volume resistivity, refractive index in longitudinal direction, thickness (average thickness, difference of height between peak and valley, distance between peak and valley, and thickness unevenness), endothermic subpeak temperature, center-line average roughness, density and space factor were measured and evaluated on the obtained biaxially oriented film.

A thermal transfer ink having the composition same as that of the Example 1 was applied to the film at a side opposite to the weld-prevention layer with a gravure coater to a coating film thickness of 1.0 μm to obtain a thermal transfer ribbon.

The adhesivity of the ink and the printing performance were evaluated on the produced thermal transfer ribbon. The evaluation results are shown in the Table 3.

Examples 11 and 12 and Comparative Example 6

A biaxially oriented film was produced in a manner similar to the Example 7 under a film-forming condition shown in the Table 3 using a polyethylene-2,6-naphthalate having an intrinsic viscosity of 0.62 measured in o-chlorophenol at 25° C. and containing a sulfonic acid quaternary phosphonium salt shown in the Table 3 in an amount corresponding to the content shown in the Table 3 (the Comparative Example 6 did not contain the sulfonic acid quaternary phosphonium salt) and further 0.4% by weight of spherical silica particles having particle diameter of 1.2 μm. A thermal transfer ribbon was produced and evaluated in a manner same as the Example 7. The evaluation results are shown in the Table 3.

The notations in the Table 3 are explained as follows.

PET: polyethylene terephthalate

PEN: polyethylene-2,6-naphthalate

Quaternary phosphonium salt A: 3,5-dicarboxybenzenesulfonic acid tetrabutylphosphonium salt Quaternary phosphonium salt B: 3,5-dicarboxybenzenesulfonic acid tetraphenylphosphonium salt

TABLE 3

| | | Example 7 | Example 8 | Example 9 | Example 10 | Example 11 | Example 12 | Comp. Example 5 | Comp. Example 6 |
|---|---|---|---|---|---|---|---|---|---|
| Film forming condition | | | | | | | | | |
| Main component | | PET | PET | PET | PET | PEN | PEN | PET | PEN |
| Quaternary phosphonium salt | | A | A | A | B | A | B | none | none |
| amount | pt. wt. | 0.052 | 0.468 | 0.013 | 0.059 | 0.042 | 0.048 | — | — |
| amount | mmol % | 2 | 18 | 0.5 | 2 | 2 | 2 | — | — |
| Longitudinal draw ratio | times | 4.6 | 4.6 | 4.6 | 4.6 | 4.5 | 4.8 | 4.6 | 4.5 |
| Lateral draw ratio | times | 3.8 | 3.8 | 3.8 | 3.8 | 4 | 3.8 | 3.8 | 4 |
| 1st heat-setting | ° C. | 220 | 220 | 220 | 220 | 220 | 220 | 220 | 220 |
| 2nd heat-setting | ° C. | 238 | 238 | 238 | 238 | 240 | 235 | 238 | 240 |
| 3rd heat-setting | ° C. | 180 | 180 | 180 | 180 | 180 | 175 | 180 | 242 |
| Cooling zone | ° C. | 90 | 90 | 90 | 90 | 110 | 105 | 90 | 110 |
| Relax (at max: heat-set temperature) | % | −2 | −2 | −2 | −2 | −2 | −2 | −2 | −2 |
| Physical property | | | | | | | | | |
| Base film thickness | μm | 3 | 3 | 3 | 3 | 3 | 2 | 3 | 3 |
| AC volume resistivity | $10^8$ Ω cm | 0.1 | 0.06 | 1 | 0.2 | 1 | 1.1 | 10 | 1 |
| Refractive index longitudinal direction) | — | 1.667 | 1.667 | 1.667 | 1.667 | ≧1.77 | ≧1.77 | 1.667 | ≧1.77 |
| Peak-valley height difference | % | 5 | 5 | 5 | 5 | 4 | 3 | 5 | 12 |
| Peak-valley distance | cm | 23 | 24 | 23 | 23 | 25 | 30 | 23 | 9 |
| Thickness unavenness | % | 9 | 9 | 9 | 9 | 8 | 7 | 9 | 17 |
| Center line average roughness | nm | 39 | 39 | 39 | 39 | 38 | 38 | 39 | 38 |
| Endothermic subpeak | ° C. | 238 | 238 | 238 | 238 | 240 | 235 | 238 | 242 |

TABLE 3-continued

| | Example 7 | Example 8 | Example 9 | Example 10 | Example 11 | Example 12 | Comp. Example 5 | Comp. Example 6 |
|---|---|---|---|---|---|---|---|---|
| temperature | | | | | | | | |
| Density | 1.400 | 1.401 | 1.400 | 1.400 | 1.358 | 1.357 | 1.400 | 1.359 |
| Space factor | 15 | 15 | 15 | 15 | 15 | 15 | 15 | 15 |
| Productivity | A | A | A | A | A | A | D | A |
| Adhesivity | 5 | 5 | 5 | 5 | 5 | 5 | 5 | 1 |
| Printing performance | ○ | ○ | ○ | ○ | ○ | ○ | ○ | x |

Examples 13 and 17

A mixture of 100 parts by weight of dimethyl terephthalate and 60 parts by weight of ethylene glycol was added with 0.024 part by weight of manganese acetate tetrahydrate and 2 mmol % of 3,5-dicarboxybenzenesulfonic acid tetrabutylphosphonium salt based on dimethyl terephthalate and subjected to transesterification reaction by slowly heating the system from 150° C. to 240° C. When the reaction temperature reached 170° C., 0.019 part by weight of antimony trioxide and then fine particles of the kinds and amounts described in the Tables 4 and 5 were added to the system. Subsequently, the system was subjected to transesterification reaction and, after the reaction, added with a solution (0.018 part by weight in terms of trimethyl phosphate) produced by heat-treating trimethyl phosphate in ethylene glycol at 135° C. for 5 hours under a pressure of 1.1 to 1.6 kg/cm$^2$. The reaction product was transferred to a polymerization reactor, heated to 290° C., and subjected to polycondensation reaction under a high vacuum of 0.2 mmHg or below to obtain a polyethylene terephthalate having an intrinsic viscosity of 0.62 measured in o-chlorophenol at 25° C.

The polymer was melted and extruded with an extruder and a T-die in the form of a sheet and brought into close contact with a water-cooled casting drum at a speed of 37.5 m/min to effect the cooling and solidification and obtain an undrawn sheet. The undrawn film was drawn by roll drawing in longitudinal direction (machine direction) at 105° C. at speed of 150 m/min at the high-speed roll side at a draw ratio of 4.6. A coating agent having the composition same as that of the Example 1 was applied as a weld-prevention layer with a gravure coater to a dried coating film thickness of 0.5 $\mu$m to the longitudinally drawn film at a side not to apply an ink layer. The face to apply an ink layer was coated with a coating agent having the composition same as that of the Example 1 as an adhesiveness improving layer with a gravure coater to a dried coating film thickness of 0.1 $\mu$m. The coated film was subjected to successive biaxial drawing in lateral direction (transversal direction) at 110° C. at a draw ratio of 3.8, heat-set in the 1st, 2nd and 3rd heat-setting zones and the cooling zone at 220, 238, 180 and 90° C. for 2 seconds each, respectively, and subjected to stretching treatment in the 2nd heat-setting zone at a stretch ratio of 2% to obtain a biaxially oriented film of 3.0 $\mu$m thick.

The number of protrusions, thickness unevenness, thickness difference between peak and valley, thickness and space factor were measured on the obtained biaxially oriented film.

A thermal transfer ink having the composition same as that of the Example 1 was applied to the film at a side opposite to the weld-prevention layer with a gravure coater to a coating film thickness of 1.0 $\mu$m to obtain a thermal transfer ribbon.

The adhesivity of the thermal transfer ink layer and the printing performance were evaluated on the produced thermal transfer ribbon. The evaluation results are shown in the Tables 4 and 5.

Examples 14, 15, 18 and 19 and Reference Examples 1, 2 and 4 to 6

Biaxially oriented films and thermal transfer ribbons made thereof were produced by the method same as the Example 13 with the exception of the change of the kinds and addition amounts of the lubricants to those described in the Tables 4 and 5. The evaluation results of the biaxially oriented films and the thermal transfer ribbons are shown in the Tables 4 20 and 5.

Examples 16 and 20

A polyethylene-2,6-naphthalate having an intrinsic viscosity of 0.62 measured in o-chlorophenol solution at 25° C. was used as a raw material and drawn 4.5 times in longitudinal direction at 144° C. and 4.0 times in lateral direction at 137° C. in a tenter oven. Biaxially oriented films were produced by the method similar to that of the Example 13 except for the use of heat-treatment, relaxation treatment and cooling treatment at heat-setting temperatures shown in the Tables 4 and 5, and thermal transfer ribbons were produced therefrom. The evaluation results of the biaxially oriented films and the thermal transfer ribbons are shown in the Tables 4 and 5.

Reference Examples 3 and 7

Biaxially oriented films and thermal transfer ribbons made thereof were produced by the method same as that of the Example 16 except for the change of the kinds and addition amounts of the lubricants and the drawing conditions to those described in the Tables 4 and 5. The evaluation results of the biaxially oriented films and the thermal transfer ribbons are shown in the Tables 4 and 5.

The following notations in the Tables 4 and 5 are defined as follows.

PET: Polyethylene terephthalate

PEN Polyethylene-2,6-naphthalate

CC: Calcium Carbonate

PS: Porous silica

AS: Aluminum silicate

SS: Spherical silica

TABLE 4

| | | Example 13 | Example 14 | Example 15 | Example 16 | Reference Example 1 | Reference Example 21 | Reference Example 3 |
|---|---|---|---|---|---|---|---|---|
| Film forming condition | | | | | | | | |
| Main component | | PET | PET | PET | PEN | PET | PET | PEN |
| Spherical silica A. | | | | | | | | |
| average diameter | μm | 1.0 | 1.8 | 0.8 | 1.0 | 2.5 | 0.5 | 1.2 |
| diameter ratio | — | 1.05 | 1.04 | 1.05 | 1.05 | 1.03 | 1.05 | 1.05 |
| addition amount | % | 0.2 | 0.1 | 0.25 | 0.2 | 0.2 | 0.3 | 0.5 |
| Spherical silica B | | | | | | | | |
| average diameter | μm | 0.3 | 0.2 | 0.5 | 0.3 | 0.5 | 0.3 | 0.3 |
| diameter ratio | — | 1.05 | 1.07 | 1.05 | 1.05 | 1.05 | 1.05 | 1.05 |
| addition amount | % | 0.1 | 0.2 | 0.07 | 0.1 | 0.1 | 0.2 | 0.2 |
| Longitudinal draw ratio | times | 4.6 | 4.6 | 4.6 | 4.5 | 4.6 | 4.6 | 4.5 |
| Lateral draw ratio | times | 3.8 | 3.8 | 3.8 | 4 | 3.8 | 3.8 | 4 |
| 1st heat-setting | ° C. | 220 | 220 | 220 | 220 | 220 | 220 | 220 |
| 2nd heat-setting | ° C. | 238 | 238 | 238 | 240 | 238 | 238 | 240 |
| 3rd heat-setting | ° C. | 180 | 180 | 180 | 180 | 180 | 180 | 180 |
| Cooling zone | ° C. | 90 | 90 | 90 | 110 | 90 | 90 | 110 |
| Relax (at max. heat-set temperature) | % | −2 | −2 | −2 | −2 | −2 | −2 | −2 |
| Physical property | | | | | | | | |
| Base film thickness | μm | 3 | 3 | 3 | 3 | 3 | 3 | 3 |
| Peak-valley height difference | % | 5 | 7 | 5 | 4 | 10 | 7 | 10 |
| Peak-valley distance | cm | 23 | 21 | 24 | 24 | 9 | 23 | 9 |
| Thickness unevenness | % | 9 | 9 | 9 | 8 | 15 | 8 | 8 |
| Surface roughness | nm | 38 | 39 | 37 | 38 | 80 | 5 | 50 |
| Number of protrusions of ≧1.5 μm high | | 0 | 0 | 0 | 0 | 100 | 0 | 0 |
| Space factor | % | 15 | 17 | 14 | 15 | 19 | 2 | 16 |
| Windability | | A | A | A | A | C | C | A |
| Adhesivity | | 5 | 5 | 5 | 5 | 3 | 5 | 3 |
| Printing performance | | ○ | ○ | ○ | ○ | Δ | ○ | Δ |

TABLE 5

| | | Example 17 | Example 18 | Example 19 | Example 20 | Reference Example 4 | Reference Example 5 | Reference Example 6 | Reference Example 7 |
|---|---|---|---|---|---|---|---|---|---|
| Film forming condition | | | | | | | | | |
| Main component | | PET | PET | PET | PEN | PET | PET | PET | PEN |
| Lubricant A | | CC | CC | CC | CC | CC | PS | CC | CC |
| Particle diameter | μm | 1.5 | 2.0 | 1.0 | 1.5 | 2.0 | 1.7 | 5.0 | 3.0 |
| Addition amount | % | 0.3 | 0.3 | 0.3 | 0.3 | 0.3 | 0.3 | 0.1 | 0.5 |
| Lubricant B | | AS | AS | AS | AS | SS | SS | AS | — |
| Particle diameter | μm | 0.8 | 0.4 | 0.8 | 0.8 | 0.5 | 0.8 | 0.8 | — |
| Addition amount | % | 0.2 | 0.2 | 0.3 | 0.2 | 0.2 | 0.2 | 0.2 | |
| Longitudinal draw ratio | times | 4.6 | 4.6 | 4.6 | 4.5 | 4.6 | 4.6 | 4.6 | 4.5 |
| Lateral draw ratio | times | 3.8 | 3.8 | 3.8 | 4 | 3.8 | 3.8 | 3.8 | 4 |
| 1st heat-setting | ° C. | 220 | 220 | 220 | 220 | 220 | 220 | 220 | 220 |
| 2nd heat-setting | ° C. | 238 | 238 | 238 | 240 | 238 | 238 | 238 | 240 |
| 3rd heat-setting | ° C. | 180 | 180 | 180 | 180 | 180 | 180 | 180 | 180 |
| Cooling zone | ° C. | 90 | 90 | 90 | 110 | 90 | 90 | 90 | 110 |
| Relax (at max. heat-set temperature) | % | −2 | −2 | −2 | −2 | −2 | −2 | −2 | −2 |
| Physical property | | | | | | | | | |
| Base film thickness | μm | 3 | 3 | 3 | 3 | 3 | 3 | 3 | 3 |
| Peak-valley height | % | 6 | 7 | 5 | 6 | 5 | 12 | 11 | |

TABLE 5-continued

| | | Example 17 | Example 18 | Example 19 | Example 20 | Reference Example 4 | Reference Example 5 | Reference Example 6 | Reference Example 7 |
|---|---|---|---|---|---|---|---|---|---|
| difference | | | | | | | | | |
| Peak-valley distance | cm | 22 | 20 | 24 | 22 | 23 | 9 | 8 | 9 |
| Thickness unevenness | % | 9 | 9 | 9 | 9 | 9 | 18 | 20 | 20 |
| Center line average roughness | nm | 38 | 39 | 37 | 38 | 50 | 60 | 90 | 55 |
| Number of protrusions of ≧1.5 μm high | | 480 | 500 | 400 | 480 | 650 | 9000 | 2000 | 1200 |
| Space factor | % | 9 | 17 | 8 | 9 | 25 | 26 | 28 | 29 |
| Film-forming property | | A | A | A | A | C | C | D | A |
| Adhesivity | | 5 | 5 | 5 | 5 | 3 | 3 | 5 | 3 |
| Printing performance | | ○ | ○ | ○ | ○ | Δ | Δ | ○ | Δ |

Example 21

A mixture of 100 parts by weight of dimethyl 2,6-naphthalenedicarboxylate and 60 parts by weight of ethylene glycol was added with 0.03 part by weight of manganese acetate tetrahydrate and subjected to transesterification reaction by slowly heating the system from 150° C. to 240° C. When the reaction temperature reached 170° C., 0.024 part by weight of antimony trioxide and then 0.4 part by weight of spherical silica particles having an average particle diameter of 1.2 μm were added to the system and, when the reaction temperature reached 220° C., a mixture of 0.042 part by weight (corresponding to 2 mmol %) of 3,5-dicarboxybenzenesulfonic acid tetrabutylphosphonium salt and 0.124 part by weight of ethylene glycol was added to the system in the form of a solution heated to 40° C. Subsequently, the system was subjected to transesterification reaction and, after the reaction, added with a solution (0.023 part by weight in terms of trimethyl phosphate) produced by heat-treating trimethyl phosphate in ethylene glycol at 135° C. for 5 hours under a pressure of 1.1 to 1.6 kg/$cm^2$. The reaction product was transferred to a polymerization reactor, heated to 290° C., and subjected to polycondensation reaction under a high vacuum of 0.2 mmHg or below to obtain a polyethylene-2,6-naphthalate polymer having an intrinsic viscosity of 0.62 measured in o-chlorophenol at 25° C.

The obtained polymer was melted and extruded with an extruder and a T-die in the form of a sheet and brought into close contact with a water-cooled casting drum at a speed of 37.5 m/min to effect the cooling and solidification and obtain an undrawn sheet. The undrawn film was drawn 4.5 times by roll drawing in longitudinal direction (machine direction) at 144° C. at a speed of 150 m/min at the high-speed roll side.

A coating agent same as that of the Example 1 was applied as a weld-prevention layer with a gravure coater to a dried coating film thickness of 0.5 μm to the longitudinally drawn film at a side not to apply an ink layer. The face to apply an ink layer was coated with a coating agent same as that of the Example 1 as an adhesiveness improving layer with a gravure coater to a dried coating film thickness of 0.1 μm. The coated film was subjected to successive biaxial drawing in lateral direction (transversal direction) at 140° C. at a draw ratio of 3.2, heat-set in the 1st heat-setting zone at 180° C. while drawing the film to increase the film width at the outlet of the 1st heat-setting zone wider than the width at the inlet of the zone by 25%, and heat-set in the 2nd and the 3rd heat-setting zones at 240° C. and 180° C., respectively, while keeping same width at the outlet and the inlet part of the zones to obtain a stock film having a thickness of 5.1 μm.

The orientation angle, Young's modulus, heat shrinkage, refractive index, endothermic peak temperature, density, thickness and space factor were measured on the obtained biaxially oriented film. The results are shown in the Table 7.

A transfer ink having the composition same as that of the Example 1 was applied to the stock film at a side opposite to the weld-prevention layer with a gravure coater to a coating film thickness of 1.0 μm and slit to prescribed width to obtain a thermal transfer ribbon.

The adhesivity of the ink and the printing performance were evaluated on the produced thermal transfer ribbon. The evaluation results are shown in the Table 7.

Examples 22 to 24 and Reference Examples 8 to 10

Stock films were produced by the method same as the Example 21 with the exception of the change of the film-forming conditions as shown in the Table 6, and thermal transfer ribbons were produced by the method same as the Example 21. The characteristics of the stock films and thermal transfer ribbons are shown in the Table 7.

Reference Example 11

A stock film was produced by the method same as the Example 21 except for the use of a polyethylene terephthalate having an intrinsic viscosity of 0.61 measured in o-chlorophenol at 25° C. and containing 0.4% by weight of spherical silica particles having particle diameter of 1.2 μm in place of polyethylene-2,6-naphthalate and the change of the film-forming conditions as shown in the Table 6, and a thermal transfer ribbon was produced from the stock film by the method same as the Example 21. The characteristics of the stock film and the thermal transfer ribbon are shown in the Table 7.

In the Tables 6 and 7, the notations are defined as follows.

PET: Polyethylene terephthalate

PEN Polyethylene-2,6-naphthalate (*) Stretching ratio: Increment of width at the outlet compared with the inlet of each heat-setting zone.

TABLE 6

| | | Example 21 | Example 22 | Example 23 | Example 24 | Reference Example 8 | Reference Example 9 | Reference Example 10 | Reference Example 11 |
|---|---|---|---|---|---|---|---|---|---|
| Film forming condition | | | | | | | | | |
| Polymer component | | PEN | PEN | PEN | PEN | PEN | PEN | PEN | PET |
| Longitudinal draw ratio | times | 4.5 | 5 | 5 | 4.1 | 4.5 | 5.5 | 3.6 | 5.6 |
| Lateral draw ratio in drawing zone | times | 3.2 | 3.3 | 3.4 | 3.2 | 3.9 | 3.2 | 3.2 | 3.2 |
| Lateral drawing temperature | ° C. | 145 | 150 | 145 | 145 | 145 | 145 | 145 | 105 |
| 1st heat-setting zone temperature | ° C. | 180 | 180 | 180 | 180 | 200 | 180 | 180 | 180 |
| (*) stretching ratio | % | 25 | 12 | 25 | 25 | 0 | 20 | 25 | 25 |
| 2nd heat-setting zone | ° C. | 240 | 240 | 235 | 240 | 240 | 240 | 240 | 240 |
| temperature | | 0 | 12 | 0 | 0 | 0 | 0 | 0 | 0 |
| (*) stretching ratio | % | | | | | | | | |
| 3rd heat-setting zone | ° C. | 180 | 180 | 180 | 180 | 180 | 180 | 180 | 180 |
| temperature | | 0 | 0 | 0 | 0 | 0 | 0 | 0 | 0 |
| (*) stretching ratio | % | | | | | | | | |
| Overall lateral draw ratio | times | 4.0 | 4.1 | 4.3 | 4.0 | 3.9 | 3.8 | 4.0 | 4.0 |

TABLE 7

| | | Example 21 | Example 22 | Example 23 | Example 24 | Reference Example 8 | Reference Example 9 | Reference Example 10 | Reference Example 11 |
|---|---|---|---|---|---|---|---|---|---|
| Physical properties of base film | | | | | | | | | |
| Thickness of base film | μm | 5.1 | 5.1 | 5.1 | 5.1 | 5.1 | 5.1 | 5.1 | 5.1 |
| Variation of orientation angle | degree | 8 | 4 | 4 | 9 | 15 | 6 | 7 | 6 |
| Orientation angle in lateral direction (max/min) | degree | 100/80 | 96/84 | 97/83 | 101/80 | 108/70 | 98/82 | 99/81 | 98/83 |
| Young's modulus | — | 1.35 | 1.30 | 1.15 | 1.14 | 1.25 | 1.58 | 1.05 | 1.08 |
| ratio YMD/YTD | $kg/mm^2$ | 740 | 780 | 780 | 720 | 690 | 840 | 680 | 560 |
| longitudinal YMD | $kg/mm^2$ | 550 | 600 | 680 | 630 | 550 | 530 | 650 | 520 |
| Lateral YTD | | | | | | | | | |
| Heat-shrinkage | | | | | | | | | |
| ratio SMD/STD | — | 0.96 | 1.20 | 0.98 | 0.84 | 0.76 | 1.43 | 0.71 | 1.03 |
| 230° C. × 10 min SMD | % | 3.8 | 5.0 | 6.0 | 3.6 | 3.4 | 6.5 | 4.3 | 8.5 |
| 230° C. × 10 min STD | % | 4.2 | 4.4 | 5.9 | 4.2 | 4.2 | 4.5 | 4.5 | 7.0 |
| 200° C. × 10 min SMD | % | 2.3 | 3.6 | 4.5 | 2.1 | 1.9 | 4.0 | 2.0 | 6.0 |
| 200° C. × 10 min STD | % | 2.4 | 3.0 | 4.6 | 2.5 | 2.5 | 2.8 | 2.s | s.s |
| 150° C. × 10 min SMD | % | 0.9 | 2.0 | 2.5 | 0.8 | 0.8 | 2.1 | 0.9 | 2.2 |
| 150° C. × 10 min STD | % | 1.0 | 2.0 | 2.5 | 1.0 | 1.0 | 1.0 | 1.0 | 1.9 |
| Refractive index in thickness direction nz | — | 1.500 | 1.501 | 1.499 | 1.503 | 1.500 | 1.498 | 1.503 | 1.498 |
| Endothermic peak other than melting point | ° C. | 240 | 240 | 235 | 240 | 240 | 240 | 240 | 240 |
| Density | $g/cm^2$ | 1.3576 | 1.3580 | 1.3560 | 1.3590 | 1.3575 | 1.3578 | 1.3581 | 1.3966 |
| Space factor | % | 18.0 | 18.0 | 18.0 | 18.0 | 18.0 | 18.0 | 18.0 | 180.0 |
| Properties of thermal transfer ribbon Printing performance | — | ○ | ○ | ○ | ○ | x | x | x | x |

Effect of the Invention

The present invention provides a biaxially oriented polyester film for a thermal transfer ribbon having excellent productivity and giving a ribbon for thermal transfer printer having excellent printing performance free from the troubles of thin ink spot even in the case of high-speed printing and creasing of the ribbon caused by the friction with a head, and a laminated film having an adhesiveness improving layer formed on the above biaxially oriented polyester film and having excellent adhesivity to a thermal transfer ink layer.

BRIEF DESCRIPTION OF THE DRAWING

The FIG. 1 is a schematic diagram of an alternate current volume resistivity measuring instrument.

The numbers in the FIG. 1 have the following meanings.

Figure 1:
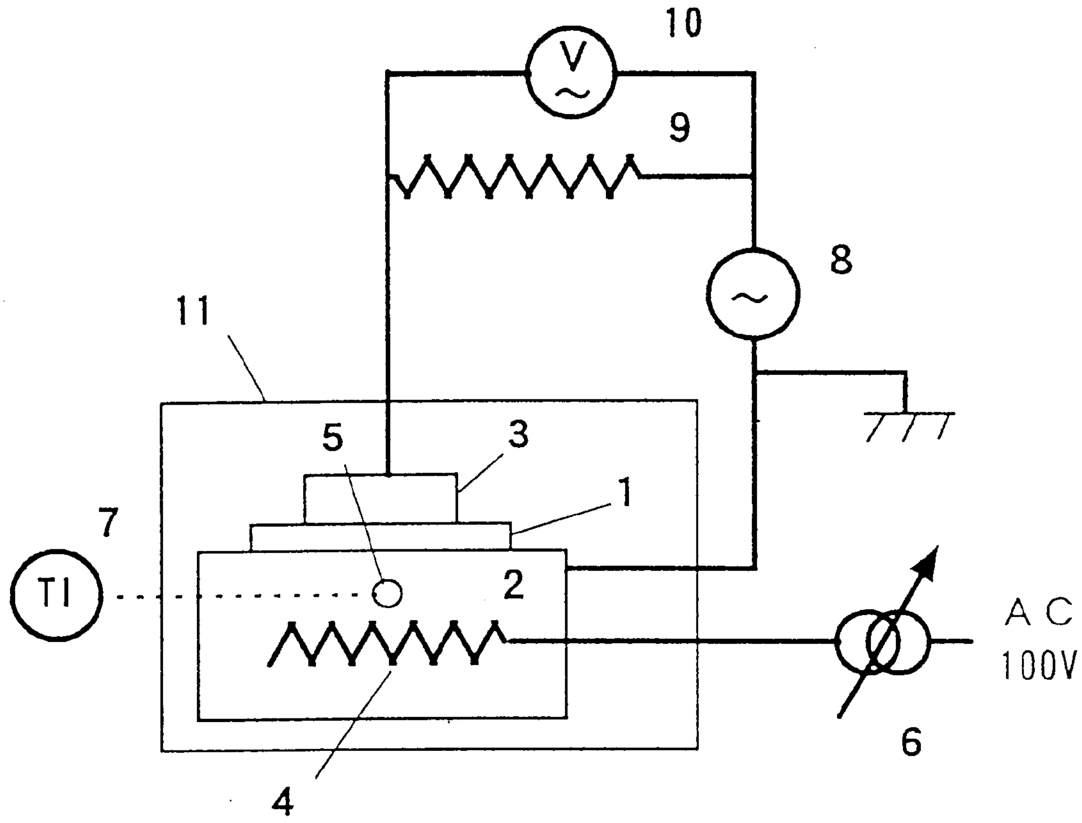

1: Specimen for measurement
2: Cylindrical lower electrode (20 cm diameter)
3: Upper electrode (5.6 cm diameter and 0.2 cm thick)
4: Voltage applying device
5: Temperature detection terminal
6: Power source
7: Temperature display
8: Power source
9: Standard resistor
10: Electron meter
11: Heat-insulation box

What is claimed is:

1. A biaxially oriented polyester film for thermal transfer use containing a polyester composed of a dicarboxylic acid component and a diol component as a constituent component characterized in that said film contains 0.1 to 40 mmol % of a sulfonic acid quaternary phosphonium salt having an ester-forming functional group based on said dicarboxylic acid component, the alternate current volume resistivity of the film is $6\times10^8$ Ω·cm or below in molten state and the endothermic subpeak temperature of the film other than the melting point and measured by DSC is between 225° C. and the melting point.

2. The biaxially oriented polyester film for thermal transfer use according to claim 1, wherein said polyester is a polyethylene-2,6-naphthalate.

3. The biaxially oriented polyester film for thermal transfer use according to claim 2, wherein the Young's modulus (YMD, $kg/mm^2$) in longitudinal direction and the Young's modulus (YTD, $kg/mm^2$) in lateral direction of said film satisfy the following formulas (1) to (3) and the heat-shrinkage (SMD, %) in longitudinal direction and the heat-shrinkage (STD, %) in lateral direction of said film after the heat-treatment at 200° C. for 10 minutes satisfy the following formula (4).

$$700 \leqq YMD \quad (1)$$

$$500 \leqq YTD \quad (2)$$

$$1.1 \leqq YMD/YTD \leqq 1.4 \quad (3)$$

$$0.8 \leqq SMD/STD \leqq 1.3 \quad (4).$$

4. The biaxially oriented polyester film for thermal transfer use according to claim 3, wherein the heat-shrinkages of said film after the heat-treatment at 150° C. for 30 minutes are 3% or less in both longitudinal and lateral directions, the heat-shrinkages after the heat-treatment at 200° C. for 10 minutes are 6% or less in both longitudinal and lateral directions, and the heat-shrinkages after the heat-treatment at 230° C. for 10 minutes are 10% or less in both longitudinal and lateral directions.

5. The biaxially oriented polyester film for thermal transfer use according to claim 2, wherein the density of said film is 1.3500 $g/cm^3$ or over and 1.3599 $g/cm^3$ or below.

6. The biaxially oriented polyester film for thermal transfer use according to claim 2, wherein the refractive index of said film in longitudinal direction is 1.77 or over.

7. The biaxially oriented polyester film for thermal transfer use according to claim 1, wherein said film contains 0.1 to 2% by weight of spherical silica fine particles (A) having a particle diameter ratio (major diameter/minor diameter) of 1.0 to 1.2 and an average particle diameter of 0.5 to 2 μm and 0.05 to 2% by weight of spherical silica fine particles (B) having a particle diameter ratio (major diameter/minor diameter) of 1.0 to 1.2 and an average particle diameter of 0.01 to 0.8 μm, the number of protrusions on the film surface having height of 1.5 μm or over is $50/cm^2$ or less, the space factor of said film is 3 to 23%, and the center-line average roughness of said film is 10 to 120 nm.

8. The biaxially oriented polyester film for thermal transfer use according to claim 1, wherein said film contains 0.1 to 2% by weight of calcium carbonate having an average particle diameter of 0.5 to 4 μm and 0.05 to 1% by weight of aluminum silicate having an average particle diameter of 0.1 to 2.0 μm, the number of protrusions on the film surface having height of 1.5 μm or over is 300 to $700/cm^2$, the space factor of said film is 1 to 19%, and the center-line average roughness of said film is 10 to 120 nm.

9. The biaxially oriented polyester film for thermal transfer use according to claim 7 or 8, wherein the center-line average roughness of said film is 10 to 40 nm.

10. The biaxially oriented polyester film for thermal transfer use according to claim 1, wherein the difference of heights between adjacent peak and valley (thickness difference) on a continuous thickness chart of said film is within 8% of the average thickness in both longitudinal and lateral directions.

11. The biaxially oriented polyester film for thermal transfer use according to claim 10, wherein the distance between adjacent peak and valley on a continuous thickness chart of said film is 10 cm or more in both longitudinal and lateral directions.

12. The biaxially oriented polyester film for thermal transfer use according to claim 10, wherein the refractive index (nz) of said film in thickness direction is 1.493 or over and 1.505 or below.

13. A laminated film characterized in that an adhesiveness improving layer containing at least one kind of resin selected from water-soluble or water-dispersible resins comprising urethane resin, polyester resin, acrylic resin or polyester resin modified with vinyl resin is applied to at least one surface of a biaxially oriented polyester film for thermal transfer use described in the claim 1.

14. A process for the production of a laminated film comprising the lamination of an adhesiveness improving layer by applying a coating liquid containing at least one kind of resin selected from water-soluble or water-dispersible resins comprising urethane resin, polyester resin, acrylic resin or polyester resin modified with vinyl resin is applied to at least one surface of a film described in the claim 1 and subjecting the product to drying, drawing and heat-setting treatments.

15. The biaxially oriented polyester film for thermal transfer use according to claim 1, wherein the orientation angle of said film in lateral direction is 75 degrees or over and 105 degrees or below.

16. The biaxially oriented polyester film for thermal transfer use according to claim 15, wherein said film is obtained from a film produced by cutting and removing strips of 100 mm wide from both edges of a stock film having an orientation angle variation in lateral direction of 0 degree or over and 10 degrees or below per 1 m of the film and the overall orientation angle of the part left after removing the strips of 100 mm wide from both edges of the stock film of 75 degrees or over and 105 degrees or below measured by taking the lateral direction of the stock film as 0 degree.

* * * * *